United States Patent
Varga et al.

(10) Patent No.: US 12,229,032 B1
(45) Date of Patent: Feb. 18, 2025

(54) EVALUATING MACHINE AND PROCESS PERFORMANCE IN DISTRIBUTED SYSTEM

(71) Applicant: Tanium Inc., Emeryville, CA (US)

(72) Inventors: Daniel Varga, Rolesville, NC (US); Christian L. Hunt, Chapell Hill, NC (US); Casey Watson, Colorado Springs, CO (US); Trever Shick, Geneva, IL (US); Michelle Rezentes, Apex, NC (US); Ryan Catherman, Apex, NC (US); Joshua F. Stoddard, Apex, NC (US)

(73) Assignee: Tanium Inc., Emeryville, CA (US)

( * ) Notice: Subject to any disclaimer, the term of this patent is extended or adjusted under 35 U.S.C. 154(b) by 0 days.

(21) Appl. No.: 18/440,922

(22) Filed: Feb. 13, 2024

Related U.S. Application Data

(63) Continuation of application No. 18/123,930, filed on Mar. 20, 2023, now Pat. No. 11,914,495, which is a
(Continued)

(51) Int. Cl.
*G06F 17/00* (2019.01)
*G06F 7/00* (2006.01)
(Continued)

(52) U.S. Cl.
CPC ............ *G06F 11/3082* (2013.01); *G06F 7/14* (2013.01); *G06F 11/3006* (2013.01);
(Continued)

(58) Field of Classification Search
CPC .... G06F 11/3082; G06F 16/22; G06F 16/245; G06F 16/248; G06F 7/14; G06F 11/3006; G06F 11/3495
(Continued)

(56) References Cited

U.S. PATENT DOCUMENTS

| | | | |
|---|---|---|---|
| 5,220,596 | A | 6/1993 | Patel |
| 5,842,202 | A | 11/1998 | Kon |

(Continued)

FOREIGN PATENT DOCUMENTS

| | | |
|---|---|---|
| EP | 1553747 A1 | 7/2005 |
| EP | 2493118 A1 | 8/2012 |

OTHER PUBLICATIONS

"Total Carbon Accounting: A Framework to Deliver Locational Carbon Intensity Data", White Paper, Nov. 2021, 29 pages.
(Continued)

*Primary Examiner* — Pavan Mamillapalli
(74) *Attorney, Agent, or Firm* — Nicholson De Vos Webster & Elliott LLP

(57) ABSTRACT

Performance of a collection of machines, arranged in a linear sequence of machines that form a linear communication orbit (LCO), is monitored. Multiple machines in the LCO receive, via the LCO, a set of rules (or various subsets of the same set of rules), each rule specifying one or a combination of conditions (e.g., a performance metric and corresponding criterion) for satisfying the rule, evaluate those rules with respect to locally occurring events and local processes, and store results of those evaluations in a local database. In response to a query sent to the machines via the LCO, each of the machines returns a report, including information identifying processes whose performance during the specified time period satisfies at least one rule in the set of one or more rules. Those reports are aggregated and used to generate a merged report reflecting performance information with respect to a set of machines.

28 Claims, 8 Drawing Sheets

Related U.S. Application Data continuation of application No. 16/943,307, filed on Jul. 30, 2020, now Pat. No. 11,609,835, which is a continuation-in-part of application No. 16/870,742, filed on May 8, 2020, now Pat. No. 11,372,938, which is a continuation-in-part of application No. 16/532,391, filed on Aug. 5, 2019, now Pat. No. 10,929,345, which is a continuation-in-part of application No. 15/215,474, filed on Jul. 20, 2016, now Pat. No. 10,482,242, and a continuation-in-part of application No. 15/215,468, filed on Jul. 20, 2016, now Pat. No. 10,372,904.

(60) Provisional application No. 62/890,556, filed on Aug. 22, 2019, provisional application No. 62/845,827, filed on May 9, 2019, provisional application No. 62/333,768, filed on May 9, 2016, provisional application No. 62/305,482, filed on Mar. 8, 2016.

(51) Int. Cl.
*G06F 7/14* (2006.01)
*G06F 11/30* (2006.01)
*G06F 11/34* (2006.01)
*G06F 16/22* (2019.01)
*G06F 16/245* (2019.01)
*G06F 16/248* (2019.01)

(52) U.S. Cl.
CPC .......... *G06F 11/3495* (2013.01); *G06F 16/22* (2019.01); *G06F 16/245* (2019.01); *G06F 16/248* (2019.01)

(58) Field of Classification Search
USPC ........................................................ 707/722
See application file for complete search history.

(56) References Cited

U.S. PATENT DOCUMENTS

| | | |
|---|---|---|
| 5,949,755 A | 9/1999 | Upadhya et al. |
| 6,049,828 A | 4/2000 | Dev et al. |
| 6,226,493 B1 | 5/2001 | Leopold et al. |
| 6,615,213 B1 | 9/2003 | Johnson |
| 6,879,979 B2 | 4/2005 | Hindawi et al. |
| 6,885,644 B1 | 4/2005 | Knop et al. |
| 6,959,000 B1 | 10/2005 | Lee |
| 7,043,550 B2 | 5/2006 | Knop et al. |
| 7,096,503 B1 | 8/2006 | Magdych et al. |
| 7,120,693 B2 | 10/2006 | Chang et al. |
| 7,225,243 B1 | 5/2007 | Wilson |
| 7,240,044 B2 | 7/2007 | Chaudhuri et al. |
| 7,299,047 B2 | 11/2007 | Dolan et al. |
| 7,483,430 B1 | 1/2009 | Yuan et al. |
| 7,555,545 B2 | 6/2009 | McCasland |
| 7,600,018 B2 | 10/2009 | Maekawa et al. |
| 7,698,453 B2 | 4/2010 | Samuels et al. |
| 7,720,641 B2 | 5/2010 | Alagappan et al. |
| 7,761,557 B2 | 7/2010 | Fellenstein et al. |
| 7,769,848 B2 | 8/2010 | Choy et al. |
| 7,844,687 B1 | 11/2010 | Gelvin et al. |
| 8,078,668 B2 | 12/2011 | Moreau |
| 8,086,729 B1 | 12/2011 | Hindawi et al. |
| 8,139,508 B1 | 3/2012 | Roskind |
| 8,185,612 B1 | 5/2012 | Arolovitch et al. |
| 8,185,615 B1 | 5/2012 | McDysan et al. |
| 8,271,522 B2 | 9/2012 | Mehul et al. |
| 8,392,530 B1 | 3/2013 | Manapragada et al. |
| 8,477,660 B2 | 7/2013 | Lee et al. |
| 8,504,879 B2 | 8/2013 | Poletto et al. |
| 8,510,562 B2 | 8/2013 | Ramakrishnan et al. |
| 8,650,160 B1 | 2/2014 | Beatty et al. |
| 8,677,448 B1 | 3/2014 | Kauffman et al. |
| 8,813,228 B2 | 8/2014 | Magee et al. |
| 8,819,769 B1 | 8/2014 | Van et al. |
| 8,885,521 B2 | 11/2014 | Wang et al. |
| 8,903,973 B1 | 12/2014 | Hindawi et al. |
| 8,904,039 B1 | 12/2014 | Hindawi et al. |
| 8,972,566 B1 | 3/2015 | Hindawi et al. |
| 9,009,827 B1 | 4/2015 | Albertson et al. |
| 9,059,961 B2 | 6/2015 | Hindawi et al. |
| 9,104,794 B2 | 8/2015 | Zakonov et al. |
| 9,246,977 B2 | 1/2016 | Hindawi et al. |
| 9,576,131 B2 | 2/2017 | Tuvell et al. |
| 9,609,007 B1 | 3/2017 | Rivlin et al. |
| 9,667,738 B2 | 5/2017 | Hindawi et al. |
| 9,716,649 B2 | 7/2017 | Bent et al. |
| 9,729,429 B2 | 8/2017 | Hindawi et al. |
| 9,769,037 B2 | 9/2017 | Hindawi et al. |
| 9,769,275 B2 | 9/2017 | Hindawi et al. |
| 9,800,603 B1 | 10/2017 | Sidagni |
| 9,910,752 B2 | 3/2018 | Lippincott et al. |
| 9,973,525 B1 | 5/2018 | Roturier et al. |
| 9,985,982 B1 | 5/2018 | Bartos et al. |
| 9,998,955 B1 | 6/2018 | MacCarthaigh |
| 10,015,185 B1 | 7/2018 | Kolman et al. |
| 10,095,864 B2 | 10/2018 | Hunt et al. |
| 10,111,208 B2 | 10/2018 | Hindawi et al. |
| 10,136,415 B2 | 11/2018 | Hindawi et al. |
| 10,148,536 B2 | 12/2018 | Hindawi et al. |
| 10,261,770 B2 | 4/2019 | Devagupthapu et al. |
| 10,372,904 B2 | 8/2019 | Hunt et al. |
| 10,412,188 B2 | 9/2019 | Hindawi et al. |
| 10,482,242 B2 | 11/2019 | Hunt et al. |
| 10,484,429 B1 | 11/2019 | Fawcett et al. |
| 10,498,744 B2 | 12/2019 | Hunt et al. |
| 10,649,870 B1 | 5/2020 | Lippincott et al. |
| 10,674,486 B2 | 6/2020 | Hindawi et al. |
| 10,708,116 B2 | 7/2020 | Hindawi et al. |
| 10,795,906 B1 | 10/2020 | Teubner |
| 10,824,729 B2 | 11/2020 | Hoscheit et al. |
| 10,841,365 B2 | 11/2020 | White et al. |
| 10,873,645 B2 | 12/2020 | Freilich et al. |
| 10,929,345 B2 | 2/2021 | Stoddard et al. |
| 11,032,298 B1 | 6/2021 | Robbins et al. |
| 11,100,199 B2 | 8/2021 | Subramaniam |
| 11,151,246 B2 | 10/2021 | Davis et al. |
| 11,153,383 B2 | 10/2021 | Richards et al. |
| 11,172,470 B1 | 11/2021 | Guieu et al. |
| 11,258,654 B1 | 2/2022 | Hindawi et al. |
| 11,277,489 B2 | 3/2022 | Freilich et al. |
| 11,301,568 B2 | 4/2022 | Dargude et al. |
| 11,343,355 B1 | 5/2022 | Goela et al. |
| 11,372,938 B1 | 6/2022 | Stoddard et al. |
| 11,461,208 B1 | 10/2022 | Lippincott et al. |
| 11,563,764 B1 | 1/2023 | Hoscheit et al. |
| 11,609,835 B1 * | 3/2023 | Varga .................... G06F 16/245 |
| 11,700,303 B1 | 7/2023 | Richards et al. |
| 11,711,810 B1 | 7/2023 | Guieu et al. |
| 11,777,981 B1 | 10/2023 | Hoscheit et al. |
| 11,809,294 B1 | 11/2023 | Lippincott et al. |
| 11,831,670 B1 | 11/2023 | Molls et al. |
| 11,886,229 B1 | 1/2024 | Goela et al. |
| 11,914,495 B1 | 2/2024 | Varga et al. |
| 11,956,335 B1 | 4/2024 | Goela et al. |
| 2001/0056461 A1 | 12/2001 | Kampe et al. |
| 2002/0007404 A1 | 1/2002 | Vange et al. |
| 2002/0042693 A1 | 4/2002 | Kampe et al. |
| 2002/0073086 A1 | 6/2002 | Thompson et al. |
| 2002/0099952 A1 | 7/2002 | Lambert et al. |
| 2002/0198867 A1 | 12/2002 | Lohman et al. |
| 2003/0101253 A1 | 5/2003 | Saito et al. |
| 2003/0120603 A1 | 6/2003 | Kojima et al. |
| 2003/0131044 A1 | 7/2003 | Nagendra et al. |
| 2003/0212676 A1 | 11/2003 | Bruce et al. |
| 2003/0212821 A1 | 11/2003 | Gillies et al. |
| 2004/0037374 A1 * | 2/2004 | Gonikberg ........ H04L 25/03229 375/341 |
| 2004/0044727 A1 * | 3/2004 | Abdelaziz ............. H04L 67/107 709/203 |
| 2004/0044790 A1 * | 3/2004 | Loach .................... H04L 45/32 709/241 |

(56) References Cited

U.S. PATENT DOCUMENTS

| | | |
|---|---|---|
| 2004/0054723 A1* | 3/2004 | Dayal .................. H04L 67/561 709/204 |
| 2004/0054889 A1* | 3/2004 | Pitsos .................. H04L 9/3236 713/176 |
| 2004/0064522 A1* | 4/2004 | Zhang ................ H04L 67/1044 709/214 |
| 2004/0076164 A1 | 4/2004 | Vanderveen et al. |
| 2004/0190085 A1 | 9/2004 | Silverbrook et al. |
| 2005/0004907 A1 | 1/2005 | Bruno et al. |
| 2005/0053000 A1 | 3/2005 | Oliver et al. |
| 2005/0108356 A1 | 5/2005 | Rosu et al. |
| 2005/0108389 A1 | 5/2005 | Kempin et al. |
| 2005/0195755 A1 | 9/2005 | Senta et al. |
| 2006/0039371 A1 | 2/2006 | Castro et al. |
| 2006/0128406 A1 | 6/2006 | MacArtney |
| 2006/0282505 A1 | 12/2006 | Hasha et al. |
| 2007/0005738 A1 | 1/2007 | Alexion-Tiernan et al. |
| 2007/0171844 A1 | 7/2007 | Loyd et al. |
| 2007/0211651 A1 | 9/2007 | Ahmed et al. |
| 2007/0230482 A1 | 10/2007 | Shim et al. |
| 2007/0261051 A1 | 11/2007 | Porter et al. |
| 2008/0082628 A1 | 4/2008 | Rowstron et al. |
| 2008/0133582 A1 | 6/2008 | Andersch et al. |
| 2008/0258880 A1 | 10/2008 | Smith et al. |
| 2008/0263031 A1 | 10/2008 | George et al. |
| 2008/0288646 A1 | 11/2008 | Hasha et al. |
| 2009/0125639 A1 | 5/2009 | Dam et al. |
| 2009/0271360 A1 | 10/2009 | Bestgen et al. |
| 2009/0285204 A1 | 11/2009 | Gallant et al. |
| 2009/0319503 A1 | 12/2009 | Mehul et al. |
| 2009/0328115 A1 | 12/2009 | Malik |
| 2010/0011060 A1 | 1/2010 | Hilterbrand et al. |
| 2010/0070570 A1 | 3/2010 | Lepeska |
| 2010/0085948 A1 | 4/2010 | Yu et al. |
| 2010/0094862 A1 | 4/2010 | Bent et al. |
| 2010/0154026 A1 | 6/2010 | Chatterjee et al. |
| 2010/0296416 A1 | 11/2010 | Lee et al. |
| 2010/0306252 A1 | 12/2010 | Jarvis et al. |
| 2011/0099562 A1 | 4/2011 | Nandy et al. |
| 2011/0231431 A1 | 9/2011 | Kamiwada et al. |
| 2011/0271319 A1 | 11/2011 | Venable, Sr. |
| 2011/0299455 A1 | 12/2011 | Ordentlich et al. |
| 2012/0053957 A1 | 3/2012 | Atkins et al. |
| 2012/0110183 A1 | 5/2012 | Miranda et al. |
| 2012/0221692 A1 | 8/2012 | Steiner et al. |
| 2012/0269096 A1 | 10/2012 | Roskind |
| 2012/0330700 A1 | 12/2012 | Garg et al. |
| 2013/0110931 A1 | 5/2013 | Kim et al. |
| 2013/0170336 A1 | 7/2013 | Chen et al. |
| 2013/0212296 A1 | 8/2013 | Goel et al. |
| 2013/0276053 A1 | 10/2013 | Hugard et al. |
| 2013/0326494 A1 | 12/2013 | Nunez |
| 2014/0075505 A1 | 3/2014 | Subramanian |
| 2014/0101133 A1 | 4/2014 | Carston et al. |
| 2014/0149557 A1 | 5/2014 | Lohmar et al. |
| 2014/0164290 A1 | 6/2014 | Salter |
| 2014/0164552 A1 | 6/2014 | Kim et al. |
| 2014/0181247 A1 | 6/2014 | Hindawi et al. |
| 2014/0181295 A1 | 6/2014 | Hindawi et al. |
| 2014/0244727 A1 | 8/2014 | Kang et al. |
| 2014/0279044 A1* | 9/2014 | Summers ........... G06Q 30/0269 705/14.66 |
| 2014/0280280 A1 | 9/2014 | Singh |
| 2014/0282586 A1* | 9/2014 | Shear .................... G06F 9/5072 718/104 |
| 2014/0372533 A1 | 12/2014 | Fu et al. |
| 2014/0375528 A1 | 12/2014 | Ling |
| 2015/0080039 A1 | 3/2015 | Ling et al. |
| 2015/0149624 A1 | 5/2015 | Hindawi et al. |
| 2015/0163121 A1 | 6/2015 | Mahaffey et al. |
| 2015/0172228 A1 | 6/2015 | Zalepa et al. |
| 2015/0199511 A1 | 7/2015 | Faile et al. |
| 2015/0199629 A1 | 7/2015 | Faile et al. |
| 2015/0256575 A1 | 9/2015 | Scott |
| 2015/0302458 A1* | 10/2015 | Dides ................ G06Q 30/0261 705/14.58 |
| 2015/0312335 A1* | 10/2015 | Ying .................... H04L 67/104 709/201 |
| 2015/0372911 A1 | 12/2015 | Yabusaki et al. |
| 2015/0373043 A1 | 12/2015 | Wang et al. |
| 2015/0378743 A1 | 12/2015 | Zellermayer et al. |
| 2016/0034692 A1 | 2/2016 | Singler |
| 2016/0080408 A1 | 3/2016 | Coleman et al. |
| 2016/0119251 A1 | 4/2016 | Solis et al. |
| 2016/0255142 A1 | 9/2016 | Hunt et al. |
| 2016/0255143 A1 | 9/2016 | Hunt et al. |
| 2016/0269434 A1 | 9/2016 | Divalentin et al. |
| 2016/0286540 A1 | 9/2016 | Hindawi et al. |
| 2016/0352588 A1 | 12/2016 | Subbarayan et al. |
| 2016/0360006 A1 | 12/2016 | Hopkins et al. |
| 2016/0378450 A1 | 12/2016 | Fu et al. |
| 2017/0093915 A1 | 3/2017 | Ellis et al. |
| 2017/0118074 A1 | 4/2017 | Feinstein et al. |
| 2017/0133843 A1 | 5/2017 | McNeill-McCallum et al. |
| 2017/0257432 A1 | 9/2017 | Fu et al. |
| 2017/0286690 A1 | 10/2017 | Chari et al. |
| 2017/0346824 A1 | 11/2017 | Mahabir et al. |
| 2018/0013768 A1 | 1/2018 | Hunt et al. |
| 2018/0039486 A1 | 2/2018 | Kulkarni et al. |
| 2018/0074483 A1 | 3/2018 | Cruz |
| 2018/0074796 A1 | 3/2018 | Alabes et al. |
| 2018/0191747 A1 | 7/2018 | Nachenberg et al. |
| 2018/0191766 A1 | 7/2018 | Holeman et al. |
| 2018/0267794 A1 | 9/2018 | Atchison et al. |
| 2018/0351792 A1 | 12/2018 | Hunter et al. |
| 2018/0351793 A1 | 12/2018 | Hunter et al. |
| 2018/0375892 A1 | 12/2018 | Ganor |
| 2019/0081981 A1 | 3/2019 | Bansal |
| 2019/0096217 A1 | 3/2019 | Pourmohammad et al. |
| 2019/0138512 A1 | 5/2019 | Pourmohammad et al. |
| 2019/0260638 A1 | 8/2019 | Yocam et al. |
| 2019/0280867 A1 | 9/2019 | Kurian |
| 2019/0319987 A1 | 10/2019 | Levy et al. |
| 2019/0361843 A1 | 11/2019 | Stoddard et al. |
| 2020/0028890 A1 | 1/2020 | White et al. |
| 2020/0053072 A1 | 2/2020 | Glozman et al. |
| 2020/0195693 A1 | 6/2020 | Price et al. |
| 2020/0198867 A1 | 6/2020 | Nakamichi |
| 2020/0202007 A1 | 6/2020 | Nagaraja et al. |
| 2020/0304536 A1 | 9/2020 | Mahabir et al. |
| 2021/0027401 A1 | 1/2021 | Hovhannisyan et al. |
| 2021/0218711 A1 | 7/2021 | Biran et al. |
| 2023/0036694 A1 | 2/2023 | Steven |
| 2023/0360040 A1 | 11/2023 | Childe et al. |

OTHER PUBLICATIONS

Abdalkarim Awad et al., "Virtual Cord Protocol (VCP): A Flexible DHT-like Routing Service for Sensor Networks", In Proceedings of the 5th IEEE International Conference on Mobile Ad Hoc and Sensor Systems, 2008, 10 pp. 133-142.

Corrected Notice of Allowability, U.S. Appl. No. 15/004,757, Aug. 24, 2018, 4 pages.

Corrected Notice of Allowability, U.S. Appl. No. 15/174,850, Jul. 25, 2018, 37 pages.

Corrected Notice of Allowability, U.S. Appl. No. 16/194,240, Mar. 31, 2020, 6 pages.

Corrected Notice of Allowability, U.S. Appl. No. 16/430,336, Oct. 15, 2020, 2 pages.

Corrected Notice of Allowability, U.S. Appl. No. 16/565,247, Oct. 15, 2020, 10 pages.

Corrected Notice of Allowability, U.S. Appl. No. 16/917,800, Dec. 16, 2021, 2 pages.

Corrected Notice of Allowability, U.S. Appl. No. 16/917,800, Nov. 18, 2021, 2 pages.

Corrected Notice of Allowability, U.S. Appl. No. 16/917,800, Oct. 25, 2021, 2 pages.

Corrected Notice of Allowability, U.S. Appl. No. 16/943,291, Apr. 11, 2022, 2 pages.

(56) References Cited

OTHER PUBLICATIONS

Corrected Notice of Allowability, U.S. Appl. No. 16/943,291, Feb. 25, 2022, 2 pages.
Corrected Notice of Allowability, U.S. Appl. No. 16/943,291, Oct. 18, 2021, 5 pages.
Corrected Notice of Allowability, U.S. Appl. No. 18/099,854, Jun. 5, 2023, 7 pages.
Final Office Action, U.S. Appl. No. 13/084,923, Jul. 1, 2013, 10 pages.
Final Office Action, U.S. Appl. No. 15/004,757, Dec. 29, 2017, 27 pages.
Final Office Action, U.S. Appl. No. 15/215,474, Apr. 1, 2019, 7 pages.
Final Office Action, U.S. Appl. No. 15/668,665, Dec. 10, 2019, 13 pages.
Final Office Action, U.S. Appl. No. 15/702,617, Dec. 27, 2018, 54 pages.
Final Office Action, U.S. Appl. No. 16/952,009, Dec. 13, 2022, 9 pages.
Final Office Action, U.S. Appl. No. 18/196,980, Mar. 11, 2024, 22 pages.
H. Brendan McMahan et al., "Communication-Efficient Learning of Deep Networks from Decentralized Data," 2017, 10 pages, Proceedings of the 20th International Conference on Artificial Intelligence and Statistics (AISTATS), Fort Lauderdale, Florida, USA.
Hood, Cynthhia S., Proactive Network-Fault Detection, Sep. 1997, IEEE Transactions on Reliability, vol. 46, No. 3, pp. 333-341.
Ian Goodfellow et al., "Deep Learning," 2016, 798 pages, MIT Press.
International Preliminary Report on Patentability, PCT App. No. PCT/US2013/076971, Jul. 2, 2015, 15 pages.
International Preliminary Report on Patentability, PCT App. No. PCT/US2014/067607, Jun. 9, 2016, 11 pages.
International Preliminary Report on Patentability, PCT App. No. PCT/US2015/020780, Oct. 6, 2016, 10 pages.
International Search Report and Written Opinion, PCT App. No. PCT/US2013/076971, Apr. 4, 2014, 17 pages.
International Search Report and Written Opinion, PCT App. No. PCT/US2014/067607, Feb. 18, 2015, 13 pages.
International Search Report and Written Opinion, PCT App. No. PCT/US2015/020780, Jul. 2, 2015, 13 pages.
IT Services, "Environmental impact of IT: desktops, laptops and screens", How we are reducing IT waste, and steps you can take to reduce your carbon footprint, available online at <https://www.it.ox.ac.uk/article/environment-and-it>, Apr. 13, 2022, 5 pages.
Jae Woo Lee et al., 0 to 10k in 20 seconds: Bootstrapping Large-Scale DHT networks, 2011 IEEE International Conference on Communications, Jun. 9, 2011, pp. 1-6.
Justin Sutton-Parker, "Can analytics software measure end user computing electricity consumption?", Springer, May 5, 2022, 19 pages.
Justin Sutton-Parker, "Determining commuting greenhouse gas emissions abatement achieved by information technology enabled remote working", The 11th International Conference on Sustainable Energy Information Technology (SEIT), Aug. 9-12, 2021, 9 pages.
Justin Sutton-Parker, Determining end user computing device Scope 2 GHG emissions with accurate use phase energy consumption measurement, The 10th International Conference on Sustainable Energy Information Technology (SEIT), Aug. 9-12, 2020, pp. 484-491.
Justin Sutton-Parker, "Quantifying greenhouse gas abatement delivered by alternative computer operating system displacement strategies", The 12th International Conference on Sustainable Energy Information Technology, Aug. 9-11, 2022, pp. 1-10.
Mongeau et al., "Ensuring integrity of network inventory and configuration data", Telecommunications Network Strategy and Planning Symposium, Networks 2004, 11th International Vienna, Austria, Jun. 13-16, 2004, 6 pgs.
Non-Final Office Action, U.S. Appl. No. 12/412,623, Mar. 7, 2011, 10 pages.
Non-Final Office Action, U.S. Appl. No. 13/084,923, Dec. 9, 2013, 13 pages.
Non-Final Office Action, U.S. Appl. No. 13/084,923, Feb. 14, 2013, 8 pages.
Non-Final Office Action, U.S. Appl. No. 13/107,625, Jan. 14, 2014, 9 pages.
Non-Final Office Action, U.S. Appl. No. 13/301,250, Jun. 26, 2013, 11 pages.
Non-Final Office Action, U.S. Appl. No. 13/797,946, Feb. 27, 2015, 18 pages.
Non-Final Office Action, U.S. Appl. No. 14/530,601, Nov. 10, 2016, 8 pages.
Non-Final Office Action, U.S. Appl. No. 14/553,769, Feb. 9, 2017, 16 pages.
Non-Final Office Action, U.S. Appl. No. 14/554,711, Jul. 29, 2016, 23 pages.
Non-Final Office Action, U.S. Appl. No. 14/554,739, Aug. 26, 2016, 30 pages.
Non-Final Office Action, U.S. Appl. No. 15/004,757, Jun. 21, 2017, 23 pages.
Non-Final Office Action, U.S. Appl. No. 15/004,757, Mar. 9, 2018, 57 pages.
Non-Final Office Action, U.S. Appl. No. 15/215,468, Oct. 4, 2018, 13 pages.
Non-Final Office Action, U.S. Appl. No. 15/215,474, Sep. 10, 2018, 10 pages.
Non-Final Office Action, U.S. Appl. No. 15/668,665, Aug. 7, 2019, 11 pages.
Non-Final Office Action, U.S. Appl. No. 15/702,617, Jun. 1, 2018, 37 pages.
Non-Final Office Action, U.S. Appl. No. 16/443,720, Sep. 4, 2020, 13 pages.
Non-Final Office Action, U.S. Appl. No. 16/870,742, Oct. 28, 2021, 7 pages.
Non-Final Office Action, U.S. Appl. No. 16/917,800, Jul. 1, 2021, 7 pages.
Non-Final Office Action, U.S. Appl. No. 16/943,291, Jul. 16, 2021, 19 pages.
Non-Final Office Action, U.S. Appl. No. 16/943,307, Apr. 27, 2022, 7 pages.
Non-Final Office Action, U.S. Appl. No. 16/952,009, Aug. 1, 2022, 8 pages.
Non-Final Office Action, U.S. Appl. No. 17/001,586, Jun. 9, 2022, 7 pages.
Non-Final Office Action, U.S. Appl. No. 17/129,638, Jul. 23, 2021, 7 pages.
Non-Final Office Action, U.S. Appl. No. 17/182,083, Apr. 27, 2023, 7 pages.
Non-Final Office Action, U.S. Appl. No. 17/503,023, Nov. 25, 2022, 7 pages.
Non-Final Office Action, U.S. Appl. No. 17/521,686, Oct. 4, 2022, 38 pages.
Non-Final Office Action, U.S. Appl. No. 17/732,402, May 21, 2024, 20 pages.
Non-Final Office Action, U.S. Appl. No. 17/751,504, Jun. 9, 2023, 31 pages.
Non-Final Office Action, U.S. Appl. No. 17/856,787, Apr. 11, 2024, 21 pages.
Non-Final Office Action, U.S. Appl. No. 18/123,930, Jul. 14, 2023, 7 pages.
Non-Final Office Action, U.S. Appl. No. 18/196,980, Sep. 8, 2023, 17 pages.
Non-Final Office Action, U.S. Appl. No. 18/204,351, Jan. 5, 2024, 8 pages.
Non-Final Office Action, U.S. Appl. No. 18/225,620, Mar. 14, 2024, 14 pages.
Non-Final Office Action, U.S. Appl. No. 18/374,621, Aug. 16, 2024, 9 pages.
Non-Final Office Action, U.S. Appl. No. 18/516,882, Aug. 28, 2024, 11 pages.
Notice of Allowability, U.S. Appl. No. 17/751,504, Dec. 18, 2023, 11 pages.

(56) References Cited

OTHER PUBLICATIONS

Notice of Allowance, U.S. Appl. No. 12/412,623, Oct. 5, 2011, 5 pages.
Notice of Allowance, U.S. Appl. No. 13/084,923, Jul. 30, 2014, 7 pages.
Notice of Allowance, U.S. Appl. No. 13/107,625, Apr. 23, 2014, 7 pages.
Notice of Allowance, U.S. Appl. No. 13/107,625, Oct. 22, 2014, 7 pages.
Notice of Allowance, U.S. Appl. No. 13/301,250, Jan. 21, 2014, 10 pages.
Notice of Allowance, U.S. Appl. No. 13/301,250, Oct. 24, 2014, 8 pages.
Notice of Allowance, U.S. Appl. No. 13/797,946, Sep. 11, 2015, 18 pages.
Notice of Allowance, U.S. Appl. No. 13/797,962, Feb. 17, 2015, 10 pages.
Notice of Allowance, U.S. Appl. No. 14/530,601, Apr. 5, 2017, 8 pages.
Notice of Allowance, U.S. Appl. No. 14/553,769, May 19, 2017, 6 pages.
Notice of Allowance, U.S. Appl. No. 14/554,711, Jan. 27, 2017, 22 pages.
Notice of Allowance, U.S. Appl. No. 14/554,739, May 9, 2017, 20 pages.
Notice of Allowance, U.S. Appl. No. 15/004,757, Jul. 16, 2018, 7 pages.
Notice of Allowance, U.S. Appl. No. 15/136,790, Nov. 20, 2017, 11 pages.
Notice of Allowance, U.S. Appl. No. 15/174,850, Jun. 20, 2018, 39 pages.
Notice of Allowance, U.S. Appl. No. 15/215,468, Apr. 1, 2019, 8 pages.
Notice of Allowance, U.S. Appl. No. 15/215,468, Jan. 24, 2019, 8 pages.
Notice of Allowance, U.S. Appl. No. 15/215,474, Jul. 11, 2019, 9 pages.
Notice of Allowance, U.S. Appl. No. 15/215,483, Jun. 7, 2018, 9 pages.
Notice of Allowance, U.S. Appl. No. 15/668,665, Mar. 2, 2020, 7 pages.
Notice of Allowance, U.S. Appl. No. 15/686,054, Jul. 18, 2018, 6 pages.
Notice of Allowance, U.S. Appl. No. 15/702,617, Apr. 23, 2019, 24 pages.
Notice of Allowance, U.S. Appl. No. 15/713,518, Apr. 10, 2019, 14 pages.
Notice of Allowance, U.S. Appl. No. 15/713,518, Jul. 29, 2019, 13 pages.
Notice of Allowance, U.S. Appl. No. 15/878,286, Apr. 25, 2019, 11 pages.
Notice of Allowance, U.S. Appl. No. 15/878,286, Jan. 10, 2020, 6 pages.
Corrected Notice of Allowability, U.S. Appl. No. 17/683,213, Oct. 7, 2024, 2 pages.
Corrected Notice of Allowability, U.S. Appl. No. 17/683,213, Sep. 26, 2024, 2 pages.
Non-Final Office Action, U.S. Appl. No. 18/196,980, Sep. 19, 2024, 24 pages.
Notice of Allowance, U.S. Appl. No. 17/683,213, Sep. 16, 2024, 18 pages.
Supplemental Notice of Allowability, U.S. Appl. No. 18/204,351, Oct. 1, 2024, 2 pages.
Notice of Allowance, U.S. Appl. No. 15/878,286, Jul. 31, 2019, 5 pages.
Notice of Allowance, U.S. Appl. No. 15/930,342, Mar. 24, 2022, 8 pages.
Notice of Allowance, U.S. Appl. No. 15/930,342, May 25, 2022, 9 pages.
Notice of Allowance, U.S. Appl. No. 16/033,131, Jun. 30, 2020, 27 pages.
Notice of Allowance, U.S. Appl. No. 16/194,240, Aug. 14, 2019, 10 pages.
Notice of Allowance, U.S. Appl. No. 16/194,240, Mar. 2, 2020, 9 pages.
Notice of Allowance, U.S. Appl. No. 16/194,240, Nov. 7, 2019, 10 pages.
Notice of Allowance, U.S. Appl. No. 16/430,336, Aug. 7, 2020, 28 pages.
Notice of Allowance, U.S. Appl. No. 16/430,336, Sep. 3, 2020, 5 pages.
Notice of Allowance, U.S. Appl. No. 16/443,720, Feb. 9, 2021, 8 pages.
Notice of Allowance, U.S. Appl. No. 16/443,720, Jun. 15, 2021, 7 pages.
Notice of Allowance, U.S. Appl. No. 16/532,391, Oct. 21, 2020, 10 pages.
Notice of Allowance, U.S. Appl. No. 16/565,247, Aug. 17, 2020, 19 pages.
Notice of Allowance, U.S. Appl. No. 16/854,844, Jul. 6, 2021, 16 pages.
Notice of Allowance, U.S. Appl. No. 16/870,742, Mar. 7, 2022, 10 pages.
Notice of Allowance, U.S. Appl. No. 16/917,800, Oct. 15, 2021, 7 pages.
Notice of Allowance, U.S. Appl. No. 16/943,291, Jan. 27, 2022, 12 pages.
Notice of Allowance, U.S. Appl. No. 16/943,291, Oct. 1, 2021, 11 pages.
Notice of Allowance, U.S. Appl. No. 16/943,307, Nov. 8, 2022, 11 pages.
Notice of Allowance, U.S. Appl. No. 16/943,307, Oct. 6, 2022, 12 pages.
Notice of Allowance, U.S. Appl. No. 16/952,009, Jul. 25, 2023, 8 pages.
Notice of Allowance, U.S. Appl. No. 16/952,009, Mar. 28, 2023, 8 pages.
Notice of Allowance, U.S. Appl. No. 17/001,586, Sep. 8, 2022, 8 pages.
Notice of Allowance, U.S. Appl. No. 17/129,638, Nov. 4, 2021, 9 pages.
Notice of Allowance, U.S. Appl. No. 17/182,083, Sep. 20, 2023, 8 pages.
Notice of Allowance, U.S. Appl. No. 17/503,023, Feb. 24, 2023, 8 pages.
Notice of Allowance, U.S. Appl. No. 17/521,686, Mar. 3, 2023, 8 pages.
Notice of Allowance, U.S. Appl. No. 17/751,504, Nov. 21, 2023, 12 pages.
Notice of Allowance, U.S. Appl. No. 17/959,177, Jun. 21, 2023, 9 pages.
Notice of Allowance, U.S. Appl. No. 17/959,177, Mar. 28, 2023, 9 pages.
Notice of Allowance, U.S. Appl. No. 18/099,854, May 26, 2023, 12 pages.
Notice of Allowance, U.S. Appl. No. 18/123,930, Nov. 7, 2023, 11 pages.
Notice of Allowance, U.S. Appl. No. 18/204,351, Jun. 21, 2024, 10 pages.
Notice of Allowance, U.S. Appl. No. 18/225,620, Jul. 18, 2024, 7 pages.
Peter Kairouz et al., "Advances and Open Problems in Federated Learning," 2021, 121 pages, arXIV: 1912.04977v3.
Ping Wang et al., "Peer-to-Peer Botnets: The Next Generation of Botnet Attacks", Jan. 2010, pp. 1-25 (Year: 2010).
Requirement for Restriction/Election, U.S. Appl. No. 12/412,623, Nov. 22, 2010, 5 pages.
Requirement for Restriction/Election, U.S. Appl. No. 13/107,625, Oct. 11, 2013, 6 pages.
Sean Rhea et al., "Handling Churn in a DHT", 2004, pp. 1-14 (Year: 2004).

(56) References Cited

OTHER PUBLICATIONS

Stoica et al., "Chord: A Scalable Peer-to-Peer Lookup Service for Internet Applications", 2001, pp. 1-12 (Year: 2002).
Supplemental Notice of Allowability, U.S. Appl. No. 16/443,720, Aug. 4, 2021, 2 pages.
Supplemental Notice of Allowability, U.S. Appl. No. 16/870,742, Apr. 11, 2022, 2 pages.
Trevor Hastie et al., "The Elements of Statistical Learning, Data Mining, Inference, and Prediction," 2001, 545 pages, Springer.
Trevor Hastie et al., "The Elements of Statistical Learning, Data Mining, Inference, and Prediction," 2008, 764 pages, Second Edition, Springer.
Weixiong Rao et al., "Optimal Resource Placement in Structured Peer-to-Peer Networks," IEEE Transactions on Parallel and Distributed Systems, vol. 21, No. 7, Jul. 2010, 16 pgs.

\* cited by examiner

EVALUATING MACHINE AND PROCESS PERFORMANCE IN DISTRIBUTED SYSTEM

CROSS-REFERENCE TO RELATED APPLICATIONS

This application is a continuation of U.S. application Ser. No. 18/123,930, filed Mar. 20, 2023, which is a continuation U.S. application Ser. No. 16/943,307, filed Jul. 30, 2020, now U.S. Pat. No. 11,609,835, titled "Evaluating Machine and Process Performance in Distributed System," which claims priority to U.S. Provisional Patent Application 62/890,556, filed Aug. 22, 2019, and is a continuation-in-part of U.S. application Ser. No. 16/870,742, filed May 8, 2020, now U.S. Pat. No. 11,372,938, titled "System and Method for Performing Search Requests in a Network," which claims priority to U.S. Provisional Application No. 62/845,827, filed May 9, 2019, and U.S. application Ser. No. 16/870,742 is also a continuation-in-part of U.S. application Ser. No. 16/532,391, filed Aug. 5, 2019, now U.S. Pat. No. 10,929,345, which is a continuation-in-part of both (1) U.S. application Ser. No. 15/215,474, filed Jul. 20, 2016, now U.S. Pat. No. 10,482,242, titled "System and Method for Performing Event Inquiries in a Network," and (2) U.S. application Ser. No. 15/215,468, filed Jul. 20, 2016, now U.S. Pat. No. 10,372,904, titled "Cost Prioritized Evaluations of Indicators of Compromise," both of which claim the benefit of U.S. Provisional Application Ser. No. 62/333,768, filed May 9, 2016, titled "System and Method for Performing Event Inquiries in a Network," and U.S. Provisional Patent Application Ser. No. 62/305,482, filed Mar. 8, 2016, titled "Cost Prioritized Evaluations of Indicators of Compromise." The content of each of the above applications is hereby incorporated by reference in its entirety.

This application is related to U.S. patent application Ser. No. 13/797,946, filed Mar. 12, 2013, now U.S. Pat. No. 9,246,977, titled "System and Network Management Using Self-Organizing Communication Orbits in Distributed Networks"; U.S. patent application Ser. No. 12/412,623, filed Mar. 27, 2009, now U.S. Pat. No. 8,086,729, titled "Distributed Statistical Detection of Network Problems and Causes"; U.S. patent application Ser. No. 13/084,923, filed Apr. 12, 2011, now U.S. Pat. No. 8,904,039, titled "Large-Scale Network Querying and Reporting"; U.S. patent application Ser. No. 13/107,625, filed May 13, 2011, now U.S. Pat. No. 8,903,973, titled "Parallel Distributed Network Management"; U.S. patent application Ser. No. 14/553,769, filed Nov. 25, 2014, now U.S. Pat. No. 9,769,037, titled "Fast Detection and Remediation of Unmanaged Assets"; U.S. patent application Ser. No. 14/554,739, filed Nov. 26, 2014, now U.S. Pat. No. 9,769,275, titled "Data Caching and Distribution in a Local Network"; and U.S. patent application Ser. No. 15/136,790, filed Apr. 22, 2016, now U.S. Pat. No. 9,910,752, titled "Reliable Map-Reduce Communications in a Decentralized, Self-Organizing Communication Orbit of a Distributed Network." Content of each of the above applications is hereby incorporated by reference in its entirety. The above applications are also referred to hereafter as "the Related Applications" or "the Incorporated Disclosure."

TECHNICAL FIELD

The present disclosure relates to secure search and management of computers in computer networks.

BACKGROUND

Network administrators (e.g., administrators of enterprise-level networks, such as banking networks, e-Commerce networks, etc.) often have difficulty obtaining timely performance evaluation for all the machines in large distributed systems, which often have thousands, tens of thousands or even hundreds of thousands of machines of numerous types. In addition, there are many ways to evaluate the performance of a machine or process, and the performance definitions used by one enterprise many not be suitable for another enterprise. Further, the machines used, and the operating systems and applications used are often in a somewhat constant state of flux, making performance evaluation even more challenging. Another challenging aspect of performance evaluation is the sheer volume of performance information that can be generated by the machines in a distributed system, making it difficult to efficiently convey (or collect) and evaluate of such performance information.

SUMMARY

Accordingly, there is a need within the realm of machine and process performance evaluation for new tools to facilitate the efficient and timely evaluation of the performance of machines in processes in a distributed system. To that end, a method is provided for monitoring performance in a network, including a collection of machines that forms a linear communication orbit (LCO). Multiple machines in the LCO receive, via the LCO, the same set of rules (or various subsets of the same set of rules), each rule specifying one condition or a combination of two or more conditions (e.g., each condition corresponding to a performance metric and a corresponding criterion) for satisfying the rule, evaluate those rules with respect to locally occurring events and local processes, and stores results of those evaluations in a local database. In response to one or more performance queries sent to the machines via the LCO, each of the machines having performance information relevant to any of the evaluated rules returns a report, including information identifying processes whose performance during the specified time period satisfies at least one rule in the set of one or more rules. Those reports are aggregated, at a server or the like, and used to present performance information to a user.

BRIEF DESCRIPTION OF THE DRAWINGS

Like reference numerals refer to corresponding parts throughout the drawings.

DESCRIPTION OF EMBODIMENTS

Figure 1A:
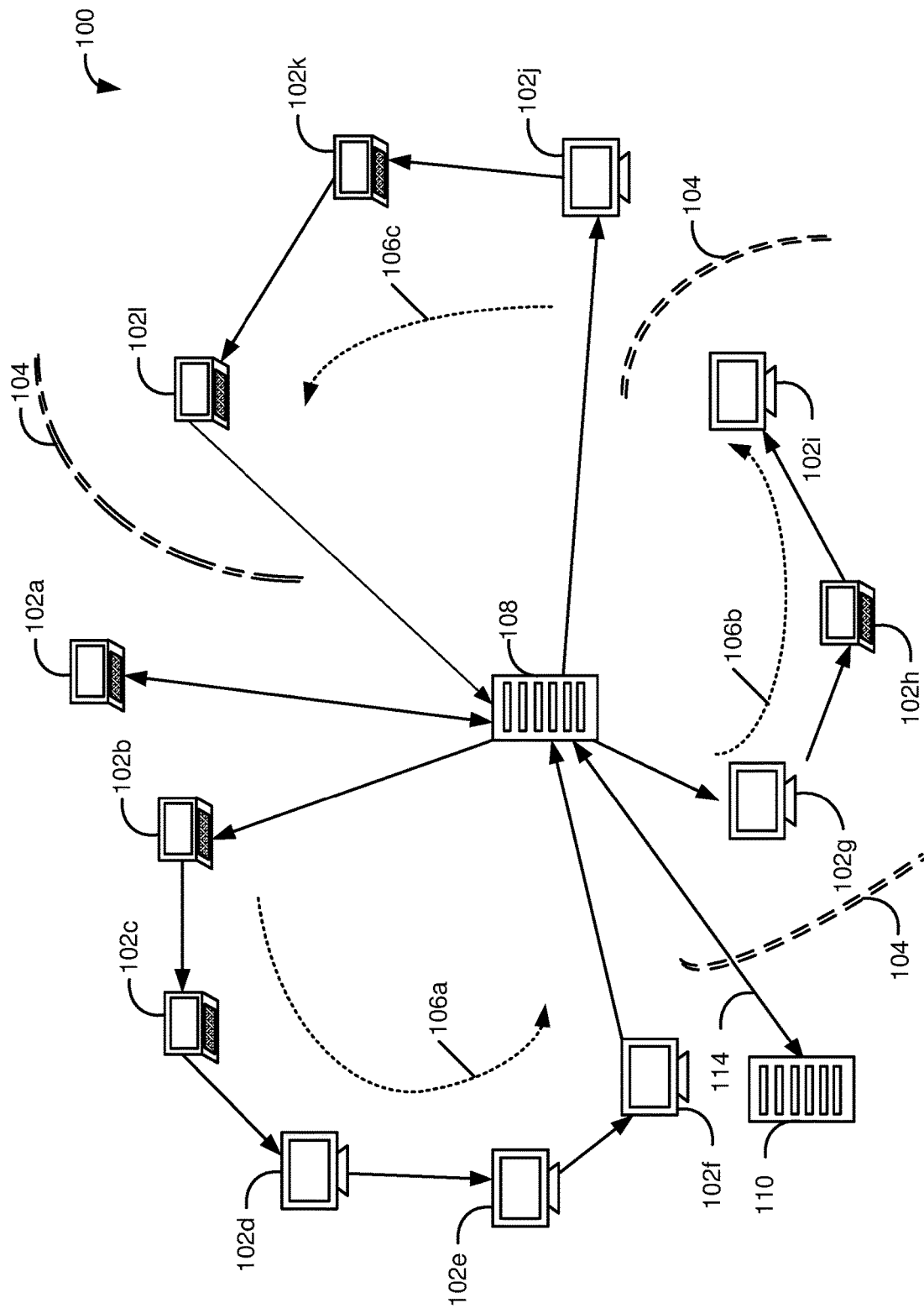
FIGS. 1A-1B illustrate a computer network organized into linear communication orbits, in accordance with some embodiments.

Some methods and devices described herein improve upon network and endpoint machine performance evaluation and management by having endpoint machines perform portions of the performance evaluation, and having a server or other machine aggregate and present performance evaluation information produced by the endpoint machines. As a result, the computational burdens of evaluating the performance of a large number (e.g., thousands or tens of thousands) of machines are spread over a large number of machines, the data transmission burdens are greatly reduced, and performance evaluations can be completed in a small fraction of the time such tasks normally take to complete.

(A1) In some embodiments, a method of monitoring or evaluating performance of a collection of machines is performed, in part, at each of N respective machines in a collection of machines that comprise nodes in a linear communication orbit, where N is an integer greater than 2. At each of the N machine, the method includes automatically monitoring a predefined set of performance metrics of the respective machine, including memory usage, processor usage, and communication channel usage; and automatically persistently storing, locally at the respective machine, in a time series database, the monitored predefined set of performance metrics and metadata for events associated with processes executed by the respective machine. The method further includes, at each of the N machines, receiving a first query through the linear communication orbit, wherein the first query has been propagated from a respective server to the respective machine though one or more upstream machines along the linear communication orbit. The first query includes a set of one or more rules, each rule in the set of one or more rules specifying a condition or a combination of two or more conditions, each condition corresponding to a performance metric in the monitored predefined set of performance metrics. For example, a respective condition of the two or more conditions specifies or corresponds to a performance metric in the monitored predefined set of performance metrics and a criterion against which the performance metric is evaluated to produce a result.

The method further includes, at each of the N machines, in response to receiving the first query, for each respective rule in the set of one or more rules, using information stored in the time series database, identifying processes, if any, whose performance during a specified time period satisfy the criterion specified by the respective rule. The method further includes, at each of the N machines, receiving a performance query through the linear communication orbit, wherein the performance query has been propagated from a respective server to the respective machine though one or more upstream machines along the linear communication orbit (and as a result, each of the N respective machines receives the performance query), generating a first performance report, the first performance report including information identifying processes whose performance during the specified time period satisfies at least one rule in the set of one or more rules; and in response to receiving the performance query, sending the first performance report through the linear communication orbit to the respective server via an end machine of the linear communication orbit.

The method further includes, at the respective server, receiving from each of the N respective machines a respective first performance report, and producing a merged report presenting performance information with respect a set of machines, including the N respective machines.

(A2) In some embodiments of the method of A1, the predefined set of performance metrics of the respective machine include one or more workload metrics, memory storage unit usage metrics, predefined events including application malfunctions, processor usage exceeding a predefined threshold, memory usage exceeding a predefined threshold, communication network impairments, and/or events that violate predefined rules.

(A3) In some embodiments of the method of any of A1-A2, the first query includes, in addition to the set of one or more rules, one or more singleton rules, each singleton rule specifying a performance metric in the monitored predefined set of performance metrics and a criterion against which the specified performance metric is evaluated to produce a result.

(A4) In some embodiments of the method of any of A1-A3, the first performance report includes, for each rule in the set of one or more rules, information identifying each process, if any, whose performance during the specified time period satisfies at least one rule in the set of one or more rules.

(A5) In some embodiments of the method of any of A1-A3, the first performance report includes, for each process identified as satisfying at least one rule in the set of one or more rules, information concerning values of a plurality of the performance metrics of the process during the specified time period.

(A6) In some embodiments of the method of any of A1-A5, the method includes: at a respective machine of the N respective machines, after sending the first performance report, receiving, from an external machine, external to the linear communication orbit, an instruction packet via the linear communication orbit, wherein the instruction packet has been propagated to the respective machine through the one or more upstream machines along the linear communication orbit, and wherein the instruction packet includes an instruction for establishing a direct duplex connection between the respective machine and the external machine. Furthermore, the method in such embodiments includes in response to receiving the instruction packet through the linear communication orbit, sending an outbound connection request to the external machine to establish the direct duplex connection between the respective machine and the external machine in accordance with a respective network connection protocol, and sending to the external machine, via the direct duplex connection, additional information, not included in the first performance report, with respect to performance information stored locally in the time series database of the respective machine.

(A7) In some embodiments of the method of A6, sending the additional information includes sending a continuing stream of the additional information, including information corresponding to current performance of the respective machine.

(A8) In some embodiments of the method of A6, sending the additional information includes, receiving one or more queries specifying performance information to be sent to the external machine, and in response to the one or more queries, sending the specified performance information on continuing basis, as a continuing stream of additional information.

(A9) In some embodiments of the method of any of A6-A8, the external machine is the respective server.

(A10) In some embodiments of the method of any of A1-A9, the linear communication orbit comprises a linearly arranged sequence of machines configured to sequentially convey messages to each machine in the linearly arranged sequence of machines in the linear communication orbit.

(A11) In another aspect, in some embodiments, a computer system includes one or more processors and memory storing one or more programs for execution by the one or more processors, the one or more programs include instructions for performing, or controlling performance of, the operations of any of the methods described herein.

(A12) In some embodiments, a non-transitory computer readable storage medium stores one or more programs, the one or more programs comprising instructions, which, when executed by a computer system with one or more processors, cause the computer system to perform, or control performance of, the operations of any of the methods described herein.

Other embodiments and advantages will be apparent to those skilled in the art in light of the descriptions and drawings in this specification.

In some embodiments, a client is a respective machine in a collection of machines that forms a linear communication network (e.g., a non-branching bi-directional communication orbit) as described in the Incorporated Disclosure, which sets forth a network topology in which messages are passed from machine to machine within the linear communication orbit. Each respective client machine, in a set of the client machines, automatically persistently stores, locally at the respective machine, in a time series database, a predefined set of performance metrics and metadata for events associated with processes executed by the respective machine.

To initiate performance evaluation or monitoring of client machines in the collection of machines, a respective server injects a set of performance evaluation rules into the linear communication orbit. This set of rules travels from machine to machine though machines upstream (in the linear communication orbit) of the respective machine before reaching the respective machine. The machines in the linear communication orbit, which is a linearly arranged sequence of machines, e.g., linearly ordered in accordance with unique identifiers of the machines, are configured to sequentially convey messages to each machine in the linearly arranged sequence of machines in the linear communication orbit. In response to receiving the set of performance evaluation rules, the respective machine, for each respective rule in the set of one or more rules, using information stored in the time series database, identifies processes, if any, whose performance during a specified time period satisfy the criterion specified by the respective rule.

In response to a performance query, sent to the respective machine via the linear communication orbit, the respective machine sends to the respective server, via the linear communication orbit, a report that includes information identifying processes whose performance during a specified time period satisfies at least one rule in the set of one or more rules.

Figure 5:
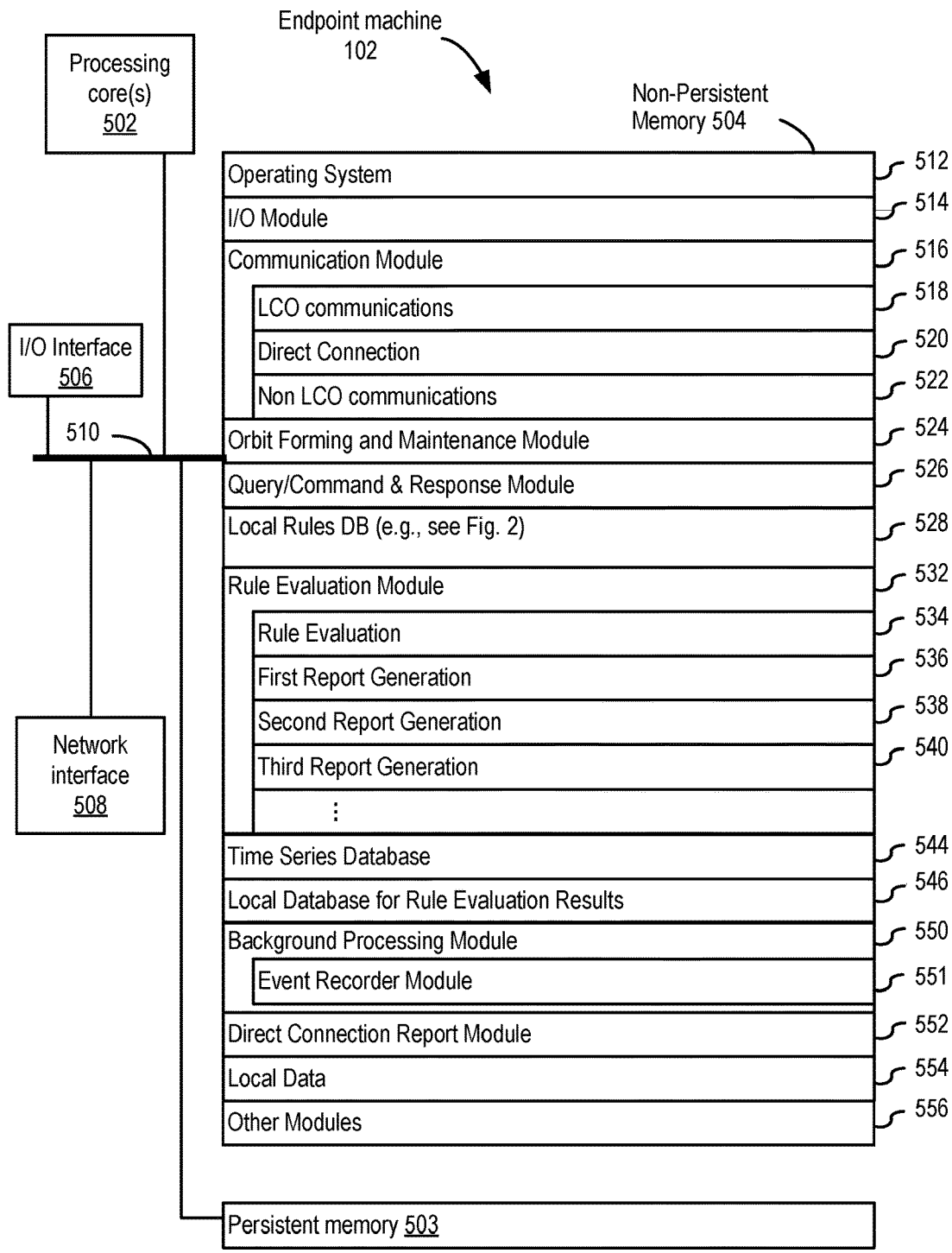
FIG. 5 is a block diagram of a system (e.g., an exemplary endpoint machine), in accordance with some embodiments.
Figure 6:
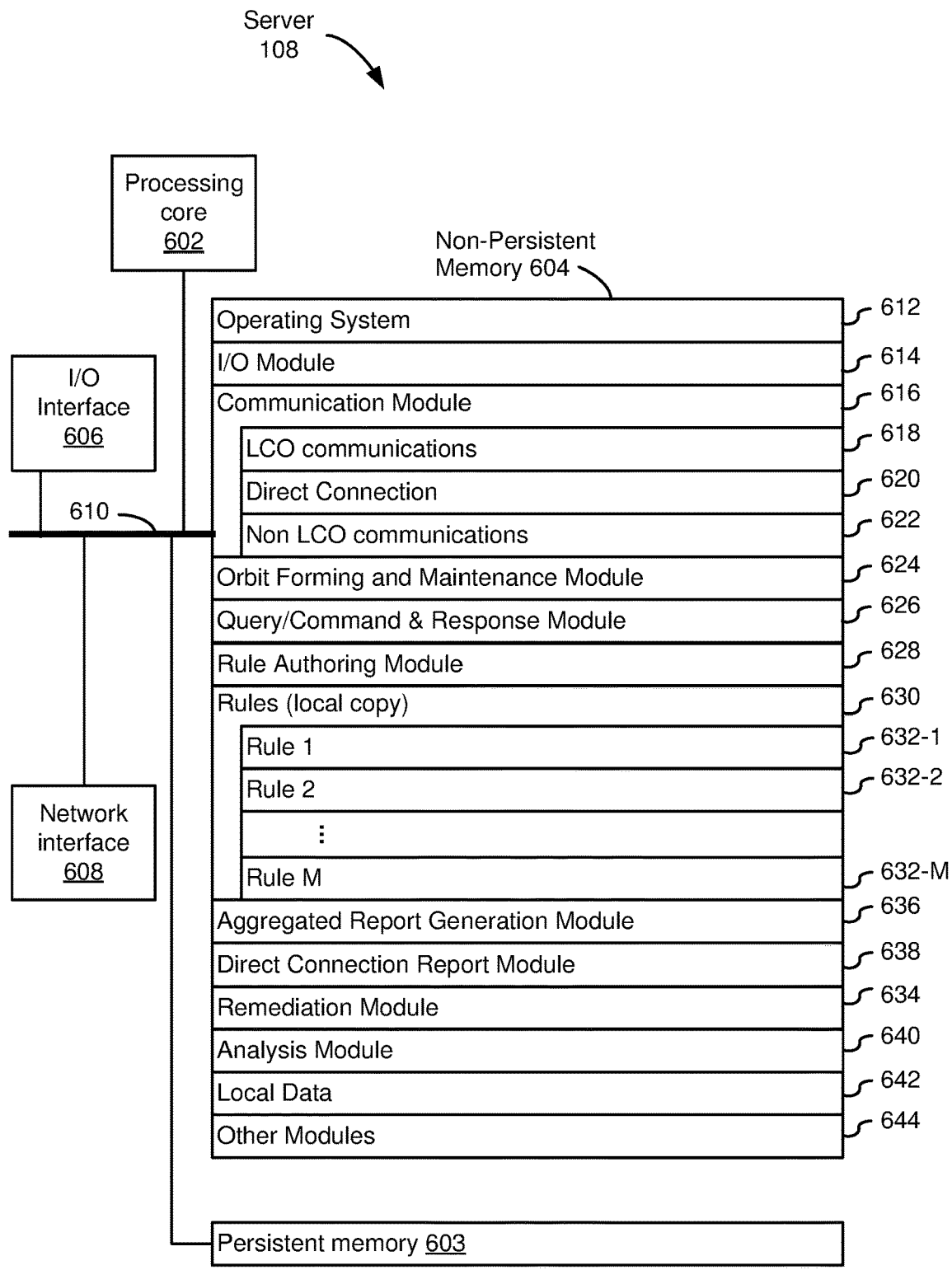
FIG. 6 is a block diagram of a system (e.g., an exemplary server of the network), in accordance with some embodiments.
Figure 7:
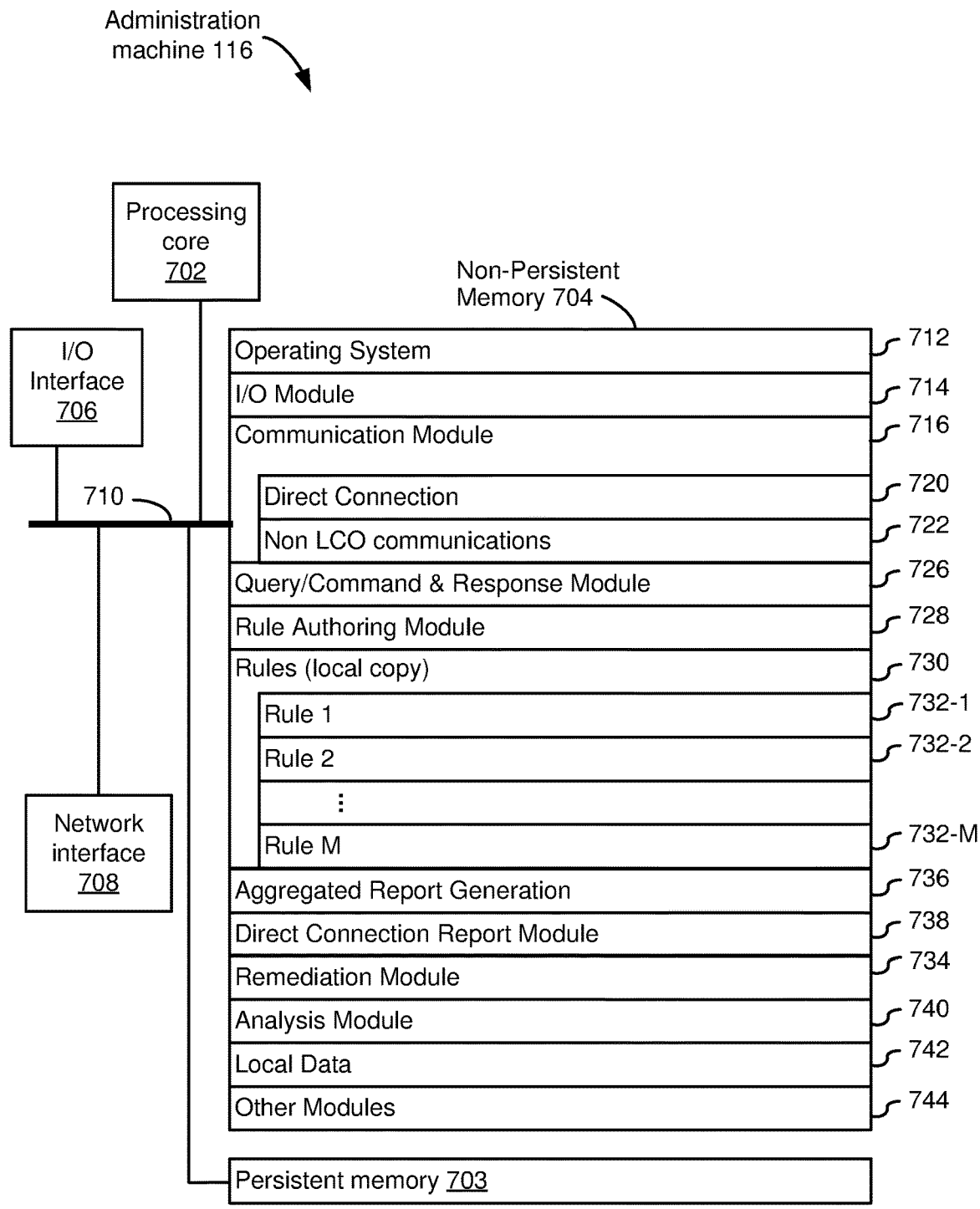
FIG. 7 is a block diagram of a system (e.g., an exemplary administrator's device or machine external to the network), in accordance with some embodiments.

Linear communication orbits are described below with reference to FIG. 1A. FIG. 1B illustrates a schematic diagram of a direct duplex connection between a machine in a linear communication orbit and a remote server. FIGS. 5-7 are block diagrams of machines in a network or machines interacting with a network (e.g., a machine, a server of a network, and an administrator's device).

Figure 1B:
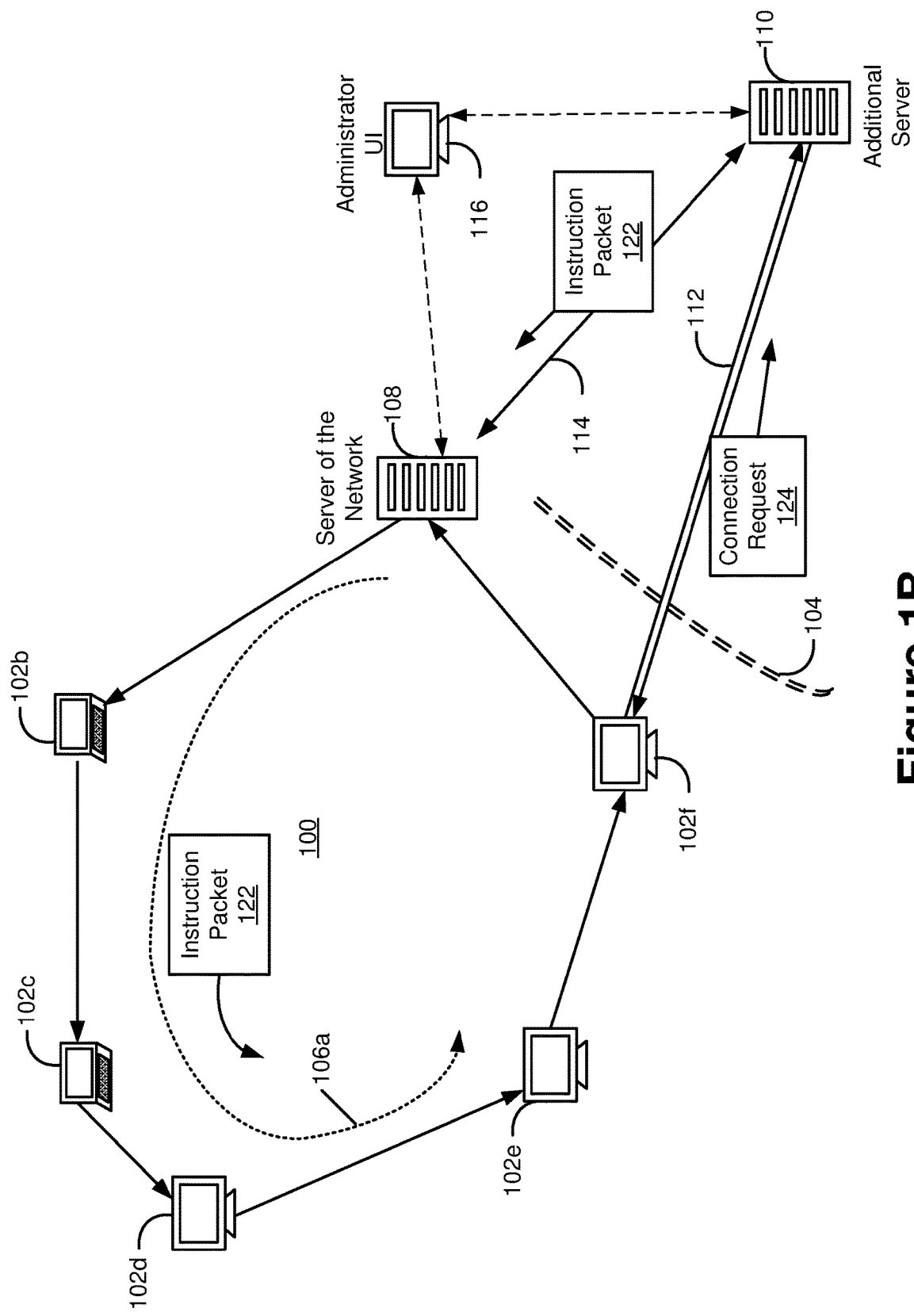

FIG. 1A illustrates a computer network organized into linear communication orbits, in accordance with some embodiments. More specifically, FIG. 1A illustrates a managed network 100 comprising a plurality of interconnected machines 102 (including 102a-1), e.g., computers, servers, mobile devices, and other networked devices that are arranged into one or more linear communication orbits. In some embodiments, the network monitoring methods described herein are performed, at least in part, at one or more machines (e.g., machine 102, see FIGS. 1A and 1B) of a linear communication orbit. In some embodiments, the methods described herein are performed, in part, at a remote server (e.g., remote server 110) that is not part of network 100 and is optionally separated from network 100 by a firewall 104, see FIGS. 1A and 1B). In some embodiments, the methods described herein are performed at an administrator's device (e.g., administrator's device 116 that interacts with one or more machines 102 through server 108 of the network and/or remote server 110, see FIG. 1B). The linear communication orbit structure shown in FIG. 1A is an alternative to the conventional hub-and-spoke or hierarchical architecture for managed networks. However, in some embodiments, the network monitoring methods described herein are performed at one or more machines/servers of a hub-and-spoke network, where the remote server sends the instruction packet to a respective machine through the server of the hub-and-spoke network or the top machine of hierarchical architecture, and allow the respective machine to initiate the outbound connection request to the remote server. However, in such cases, the benefit and efficiency of the linear communication orbit may be lost.

Examples of managed network 100 include enterprise networks or other networks under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104. In some embodiments, the network 100 is separated from external networks by one or more firewalls 104.

In some embodiments, machines 102 currently coupled to network 100 are self-organized into one or more contiguous segments 106 of a single linear communication orbit. In some embodiments, each contiguous segment 106 constitutes a respective linear communication orbit. Methods of self-organization of linear communication orbits are further described in U.S. Pat. No. 10,136,415, entitled "System, Security and Network Management Using Self-Organizing Communications Orbits in Distributed Networks," which is hereby incorporated by reference in its entirety.

In some embodiments, managed network 100 also includes server 108 that facilitates the creation and maintenance of the one or more contiguous segments 106. The server 108 may be relatively lightweight, and in some embodiments may be elected from machines 102 in the network.

In some embodiments, as shown in FIG. 1A, the linear communication orbit linking all of the machines coupled to network 100 includes a respective communication channel between each pair of adjacent machines in an ordered sequence of machines 102 in network 100. In some embodiments, communication between a pair of adjacent machines 102 (e.g., machine 102g and machine 102f) across a firewall 104 may need to be bridged by an intermediate server (e.g., server 108).

An important feature of linear communication orbit(s) 106 is that, in some embodiments, they are automatically formed without global, continuous, and/or active intervention by any network administrative program or personnel. Each machine 102 joining network 100 is equipped with (or provided with) a set of predetermined organization rules. According to the set of predetermined organization rules, each machine 102 finds its immediate neighbor machines and coordinates with these immediate neighbor machines to self-organize into a local segment of the linear communication orbit. The local segments of adjacent machines overlap and fuse into a contiguous segment of the linear communication orbit. In some embodiments, the linear communication orbit grows or contracts as machines join and leave network 100 (e.g., the network is non-static), through the independent local actions of the machines in network 100, without global, continuous, and/or active intervention by any network administrative programs or personnel. Although all machines 102 implement the same set of predetermined organization rules, and each machine directly interacts only with its immediate neighbor machines to facilitate the formation of the orbit, the predetermined organization rules are designed in a way that cause the machines' independent local actions to be globally consistent and to result in self-organization and automatic repair and maintenance of linear communication orbit(s) 106.

In some embodiments, all machines 102 coupled to network 100 are sorted into an ordered sequence according to a respective unique identifier associated with each machine 102. These identifiers are also referred to as the addresses of the machines in the network, or as machine identifiers. For example, in some embodiments, respective IP addresses of machines 102 are used as the identifiers to sort the machines into a linearly ordered sequence. In some embodiments, the machines are sorted according to decreasing IP address values, an upstream direction of the linear communication orbit is the direction of increasing IP address values, and a downstream direction of the linear communication orbit is the direction of decreasing IP address values. In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined organization rules provides a deterministic way of sorting the unique identifiers or addresses of that type into an ordered sequence. Given the identifiers or addresses of two machines in the network, the relative order of the two machines and their distances in the linear communication orbit (also referred to as an interval between the two machines) can be determined. In some embodiments, not all possible addresses are occupied by a corresponding machine in the network.

In some embodiments, each machine 102 receiving a communication message (e.g., a message including a question part, and an answer part) from its upstream neighbor machine acts upon the message by providing an update to the message based on its local state or information, performing some aggregation of the information in the message (e.g., by adding to or modifying aggregated results already included in the message as received from its upstream neighbor), and/or forwarding the message to its downstream neighbor machine along the linear communication orbit. Essentially, each machine expends a small amount of resources to take on a small part of the duties of data aggregation without being overly burdened. More details on how the system, security, and network management messages are propagated to and collected from machines 102 in network 100 through linear communication orbit(s) 106 are provided in the Incorporated Disclosure.

An advantage of conveying message communications over the linear communication orbit is that queries, answers, and/or instructions (e.g., device management instructions) can be quickly passed to and from many machines without excessive communication and computational overhead. In some embodiments, server 108 (or a remote server 110 in communication with server 108) generates individual queries, where each query contains a request for evaluation of one or more rules at one or more targeted machines (e.g., machines that meet certain criteria specified in the query). In some embodiments, the server determines the order, frequency, and/or priority by which the queries should be injected. The individual machines perform local evaluation of the rules in accordance with the evaluation criteria, and send the results back to server 108 through the linear communication orbit.

The machines in the linear communication orbit are configured to sequentially convey messages to each machine in the linearly arranged sequence of machines in the linear communication orbit, e.g., by conveying each such message along a linear request path or linear return path through the linear communication orbit. In some embodiments, some messages are configured to be sequentially conveyed to each of the machines in a linear communication orbit, without waiting for each of those machines to perform local processing or add information to the message before passing it to the next machine in the linearly arranged sequence of machines. For example, such a message can be used to initiate performance of a task or set of tasks at one or more of the machines, such as evaluation of a query or a set of rules. Subsequently, a second message is sent through the linear communication orbit to collect results produced by the machines that perform the task or set of tasks, with each machine in the linear communication orbit adding any results it was to a payload portion of the second message before conveying it to a next machine (if any) in the linear communication orbit; upon reaching a last machine (e.g., at an end node of the linear communication orbit), the second message, including its payload of accumulated results, is conveyed back to the server that injected the queries into the linear communication orbit. In this way, the tasks or set of tasks are performed at multiple machines along the linear communication orbit in parallel, and the results are "picked up" by a subsequent message. When a linear communication orbit includes dozens or hundreds of machines all performing the same task or set of tasks, the end-to-end processing time from the initial injection of the first message to the return of results from all the machines can be reduced by a factor of ten or more, or even hundreds or more, compared with alternative techniques in which the machines individually communicate with the server.

In some embodiments, server 108 sends the results (e.g., sends an aggregated response) to remote server 110. In some embodiments, remote server 110 communicates with server 108 via secure connection 114. In some embodiments, when remote server 110 needs to send a message or instruction packet to a particular machine in the network and a direct connection between remote server 110 and the particular machine does not already exist, remote server 110 optionally sends the message to server 108 and has server 108 forward the message or instruction packet to the particular machine along the linear communication orbit. In some embodiments, remote server 110 starts a network-wide information gathering processes by sending a series of queries to server 108 (or a head machine of the linear communication orbit), allowing server 108 (or the head machine) to propagate the queries into the network along the linear communication orbit, and receiving the answers or evaluation results (e.g., individual answers, aggregated answers, and/or metrics and statistics computed based on the answers or evaluation results collected from the machines in the network) from server 108 (or an end machine of the linear communication orbit).

The lightweight, decentralized mechanism (e.g., the set of common action rules observed by the machines in the network) allows the machines in the network to self-organize into one or more linear communication orbits, and allows the linear communication orbits to recover/self-heal from broken links and slow connections (e.g., by temporarily bypassing the unresponsive machines) without active administrative intervention. The self-organization and self-healing aspects of the linear communication orbits ensure that communication and data collection bottlenecks are quickly discovered and eliminated, without causing much observable impact on the communication and data collection speed. In addition, when collecting data along the linear communication orbits, the server may inject queries regarding different aspects of the machines in separate messages, and the messages may be propagated down the linear communication orbit, processed in parallel at the machines, and answered by as many machines as possible (e.g., machines that satisfy per matching criteria specified by the messages), without being held up by any slow responding machines. In fact, communication with and data collection from any and all machines in the network (e.g., enterprise networks with thousands or millions of machines) may be accomplished in substantially real-time (e.g., a matter of seconds), as opposed to taking days and weeks in a network with a conventional hierarchical or hub-and-spoke configuration. For example, messages are delivered to the machines at the speed at which messages are propagated through the linear communication orbit, and the processing of the queries at the machines occurs after receiving the messages, in parallel at the machines. In some embodiments, answers to the queries are collected in a subsequent traversal of the linear communication orbit by either the original messages (propagating in the reverse direction) or by subsequent "answer collection" messages.

FIG. 1B illustrates that, in some embodiments, remote server 110 communicates (e.g., sends messages and/or queries) directly with a respective machine (e.g., machine 102*f*) over direct duplex connection 112 (e.g., a WebSocket connection). Various methods are provided herein for establishing direct duplex connections between remote server 110 and machines 102 in a linear communication orbit. For example, a direct duplex connection is established between a respective machine and the remote server (e.g., remote server 100), in accordance with some embodiments. In some embodiments, the direct (e.g., point-to-point) duplex connection can be used by the remote server to perform event inquiries at the respective machine. In some embodiments, the remote server performs certain queries at the direction of an administrator. The administrator interacts with the remote server using an administrator's device (e.g., administrator's device 116) that is connected to the remote server (e.g., remote server 110) via a web interface or an application user interface provided by the remote server. In some embodiments, the administrator's device is also connected to a server of the network (e.g., server 108). The administrator can communicate with (e.g., issue instructions and questions, and receive responses) a particular machine in the network through the remote server, when a direct duplex connection has been established between the remote server and the particular machine. The administrator can also communicate with a particular machine through a server of the network (e.g., issue queries to the server of the network and have the query propagated along the linear communication orbit, and receive aggregated answers collect from machines along the linear communication orbit).

Direct duplex connection 112 is particularly useful when a remote server needs to take a deep-dive into a respective machine in the network (e.g., to carry out frequent back and forth interactions and/or to transfer large amount of local event data and/or to request sensitive information), rather than investigating the network at-large. The messages and/or queries can be analogous to those described above (or can contain different material), but they are sent directly to the respective machine via direct duplex connection 112 (rather than being propagated through linear communication orbit 106*a*), and without the communication needing to be bridged by server 108. In some embodiments, only those queries sent via a direct duplex connection return certain types of information to the external server (e.g., snippets of file text are only sent via secure direct duplex connections, not through a linear communication orbit). In some embodiments, remote server 110 can communicate with the respective machine either through direct duplex connection 112 (e.g., when remote server 110 wants to query only the respective machine) or through linear communication orbit 106*a* (e.g., when remote server 110 wants an aggregated response to a query from some or all of the machines 102 in the linear communication orbit 106*a*).

As described herein, the direct duplex connection between a particular machine and remote server 110 is established with the particular machine as the initiating party. In other words, from the perspective of the network, the connection is established with an outbound connection request sent from the machine, rather than with an inbound connection request sent from the remote server. When the direct duplex connection is established with an outbound connection request sent from the machine (e.g., the machine sends the initial connection request in the connection establishment protocol (e.g., the handshake request in establishing a WebSocket connection)), there is no need to open the firewall of the network, which would expose the network to outside security risks.

In some embodiments, in order to prompt a particular machine to initiate the connection request for a direct duplex connection, remote server 110 sends a message or instruction packet 122 to the particular machine (e.g., machine 102*f*) through a server of the network (e.g., server 108) and has the message or instruction packet 122 propagated to the particular machine through the linear communication orbit (e.g., linear communication orbit 106*a*). The message or instruction packet 122 contains instructions and necessary data (e.g., public certificate for encryption, IP address, port #) for the particular machine to establish the direct point-to-point persistent connection (e.g., a WebSocket connection) with the remote server. When the particular machine receives the instruction packet 122 from its upstream machine, the particular machine initiates the outbound connection request 124 to the remote server. After the remote server receives the connection request 124 from the particular machine, the remote server and the machine can proceed to establish the duplex connection according to the connection protocol.

In some embodiments, the direct connection is encrypted as described above. In some embodiments, the instructions comprise an instruction packet 122 that includes an encryption key for encrypting the local data at the respective machine before uploading to the local data to the respective server. The respective server possesses a decryption key corresponding to the encryption key. The instruction packet further includes instructions for encrypting the local data before uploading the local data to the respective server through the direct connection.

In some embodiments, apart from presenting the network monitoring user interface to an administrator, the administrator's device can also be a regular machine in the network and have the same characteristics and functions of other machines in the network with respect to the maintenance and workings of the linear communication orbit. In some embodiments, the server of the network can be lightweight and in some embodiments may be implemented by a machine in the network; thus, the administrator's device can also serve as the server of the network in some scenarios. When the administrator's device also serves as the server of the network, actions performed "through the server of the network" are performed by the administrator's device directly.

In some embodiments, the instruction packet 122 can be dispatched to one or more particular machines at the command of a network administrator or security incident responder. For example, the network administrator uses an administrator's device 116 to connect to remote server 110 (e.g., via a web interface or a client application provided by a service provider associated with the remote server 110) and manually selects the particular machines using a network monitoring user interface. In some embodiments, the network monitoring user interface provides other functions as described in the Incorporated Disclosure.

In some embodiments, an event recorder (e.g., event recorder module 551, FIG. 5) is deployed on each machine in the network that continuously records local values for particular indicator items (e.g., commonly used indicator items, such as filenames of newly created/modified/deleted/executed files, IP addresses of network connections, ports accessed, and processes started/killed, etc.) to a local event database. In some embodiments, the local event database is a time series database (e.g., time series database 544, FIG. 5) used to store performance metrics as well as metadata for events associated with processes executed by the respective machine. In some such embodiments, each respective machine automatically monitors a predefined set of performance metrics of the respective machine, including memory usage, processor usage, and communication channel usage; and automatically persistently stores, locally at the respective machine, in the time series database, the monitored predefined set of performance metrics and metadata for events associated with processes executed by the respective machine.

An administrator can query these local event databases from the network monitoring user interface by issuing questions to the network through the linear communication orbit. For example, the administrator's device can send the questions to the server of the network and the questions may be packaged in query messages and propagated to the machines through the server of the network. Each machine along the linear communication orbit will be able to respond quickly to these questions based on the past event data stored in their respective local event databases. After the answers have been collected from all relevant machines in the network, the server of the network forwards the answers back to the administrator's device.

In some embodiments, after a direct duplex connection has been established between a particular machine and the remote server, the administrator (using the administrator's device) can also query the local event database of the particular machine through the direction duplex connection. In addition, the administrator (using the administrator's device) can take a snapshot of the local event database (or a particular portion of the local event database) on the particular machine and have it uploaded to the remote server, so that in-depth analysis regarding the particular machine may be performed at the remote server (e.g., according to instructions provided by the administrator to the remote server).

Figure 2:
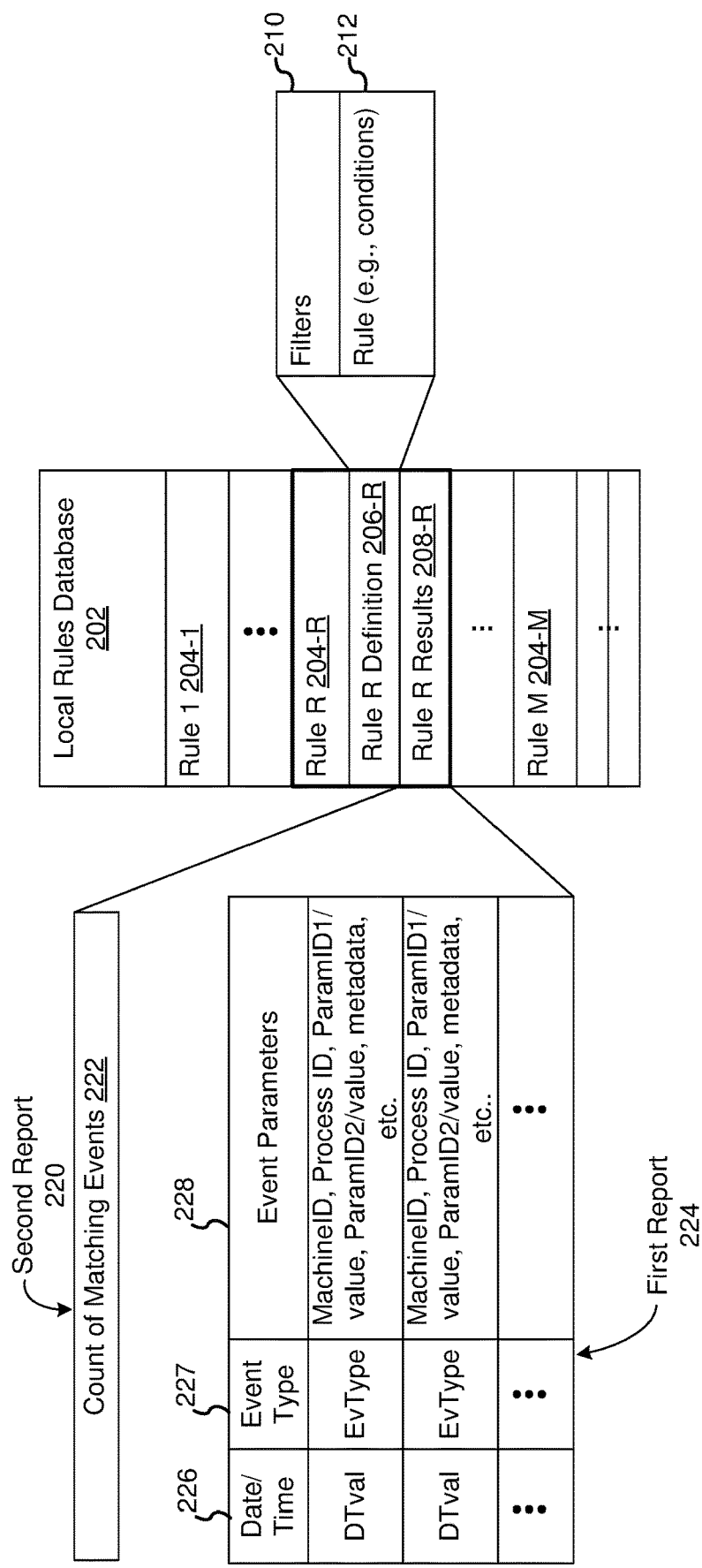
FIG. 2 illustrates an example local database including rule definitions and results, in accordance with some embodiments.

FIG. 2 illustrates an exemplary local rules database 202 at a respective machine 102. The local rules database 202 stores a set of one or more rules 204 (e.g., Rule 1 (204-1), Rule R (204-R), and Rule M (204-M), etc.) and, for each rule, a rule definition 206 (e.g., 206-R) and rule results 208 (e.g., 208-R). In some embodiments, a rule comprises a set of conditions (e.g., optionally represented as Boolean expression, or as a list of one or more conditions) that can be evaluated, e.g., using information stored in a local events database of the respective machine. In some embodiments, a rule can contain zero or more filters, and one or more conditions, where each condition corresponds to a performance metric in the predefined set of performance metrics monitored by the respective machine. In some embodiments, a respective condition comprises a performance metric and a criterion against which the performance metric is evaluated to produce a result. Example of rules include "Processes that terminate abnormally," "Memory usage exceeds threshold," "Processes in which a PP1 (a first performance parameter) satisfies a first criterion (e.g., exceeds a first threshold) and PP2 (a second performance parameter) satisfies a second criterion (e.g., falls outside a predefined range). Examples of filters are "Database processes" and "Processes whose name begins with (or includes) a specified string."

In some embodiments, the local rules database 202 of the respective machine also stores rule evaluation results 208, while in some other embodiments rule evaluation results 208 are stored in another local database (e.g., local database for rule evaluation results 545, FIG. 5). In some embodiments, rule evaluation results 208 (whether stored in local rules database 202 or elsewhere) include a first report 224, which includes, for a respective rule, such as Rule R, 204-R, event parameters 228 sufficient to identify the date and time of the event, the machine and process at which the event occurred, and one or more parameter values (e.g., parameter-value pairs, each of which identifies a parameter and its value at a time (or during a time period) corresponding to the event). From another perspective, first report 224 includes information identifying processes whose performance during the specified time period satisfies at least one rule in the set of one or more rules. In some embodiments, first report 224 is stored as a table, with one or more fields (e.g., event type 227, and/or date/time 226) that function as keys for sorting the table. Event parameters 228 (or 226, 227 and 228) may be organized in results 208 to facilitate various types of aggregation of such events into event summaries or counts of events with respect to various subcategories of an event type associated with the corresponding rule 204.

In some embodiments, rule evaluation results 208 include a second report 220, which includes aggregated event information, such as counts 222 events (e.g., counts of one or more types of events) at the respective machine that satisfy the respective rule (e.g., events at processes that satisfy rule R 204-R) in a predefined time period.

In some embodiments, the first report 224 and second report 220 are automatically generated by a background processing module (e.g., background processing module 550, FIG. 5) that evaluates one or more previously received rules 204, with new instances of those reports being generated for each successive time period, e.g., time periods of one hour. In some embodiments, when the first and/or second reports are collected (e.g., by server 108, additional server 110 or administrator machine 116, FIG. 1B) for analysis, the query used to collect them specifies the time period(s) for which reports are to be collected.

It is noted that in the description of FIG. 2, the term "first report" has been used to describe first information produced for a particular rule, and "second report" has been used to describe second information produced for a particular rule. However, in the descriptions provided below, with respect to embodiments in which the set of one or more rules includes a plurality of rules, the "first report" optionally includes the first reports 220 for all the rules in a set of rules, and the "second report" optionally includes the second reports 224 for all the rules in the set of rules. In some embodiments, as discussed below, the information returned to a requesting machine in response to a performance query includes the second report 225, or the first report 224 and second report 220.

FIGS. 3A-3F collectively illustrate prophetic examples of performance reports produced using the information returned in response to performance queries, for multiple machines in a collection of machines, in accordance with some embodiments. These examples show that the performance metrics and event metadata information returned to the server or external machine in response evaluation of a set of rules, and/or in response to additional queries, can be viewed by a network administrator from multiple perspectives in order to gain insight into the performance of a large number of endpoint machines and the processes running on those machines. By viewing the collected data from these multiple perspectives, and/or additional perspectives associated with additional types of reports, the network administrator for a distributed set of machines may determine additional performance information that needs to be collected, or may determine additional rules to send to the endpoint machines, or may identify the cause or likely cause of problems adversely affecting performance of various machines, applications or processes in the distributed system from which performance data is being collected.

Figure 3A:
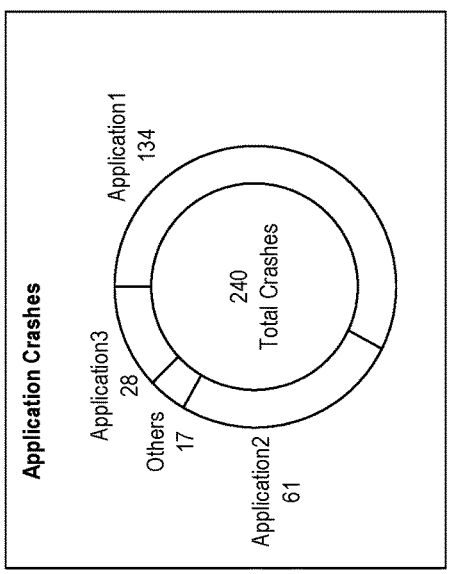
FIGS. 3A-3F collectively illustrate examples of performance reports produced using the information returned in response to performance queries, for multiple machines in a collection of machines, in accordance with some embodiments.
Figure 3B:
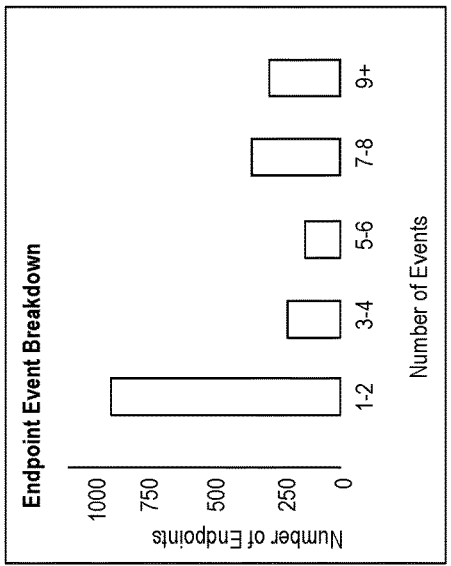
Figure 3C:
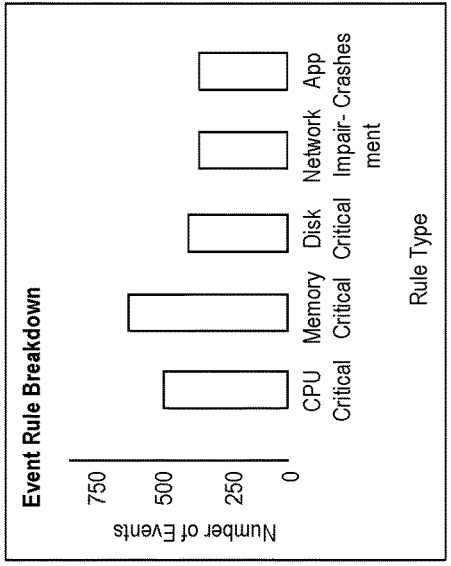

FIG. 3A is a prophetic example of a "rule breakdown" report, showing numbers of events reported, during a predefined or specified time period, for each of a number of types of rules. FIG. 3B is a prophetic example of a "rule breakdown" report, showing the number of endpoints for each of several different ranges of event activity (e.g., 1 to 2 events, or 3-4 events, 5-6 events, 7-8 events, and 9 or more events) were reported during a predefined or specified time period. FIG. 3C is a prophetic example of a report of application crashes (applications whose execution ended abnormally), broken down by application or application name, across a large number of endpoint machines (e.g., over 3000 endpoint machines) during a predefined or specified time period (e.g., a 24 hour time period).

Figure 3D:
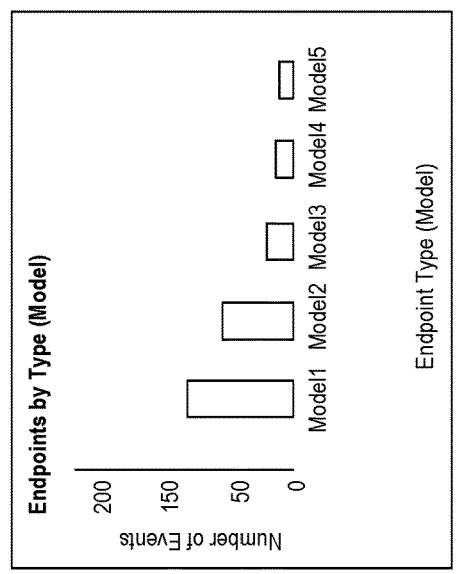
Figure 3E:
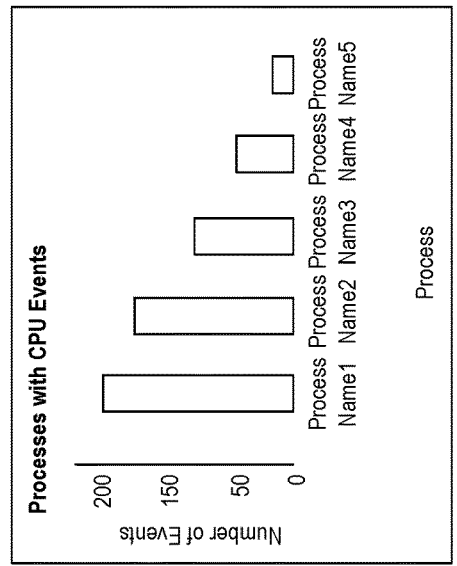
Figure 3F:
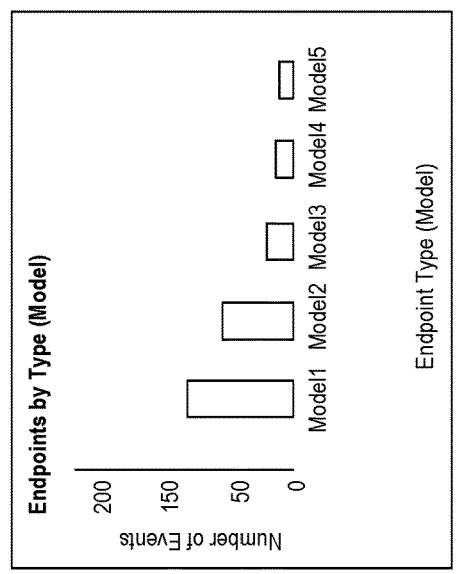

FIG. 3D is a prophetic example of an "endpoint health" report, showing the number of endpoint machines from which information was received, the number of errors, the number of events, the number without events, and the number lacking at least some configuration information (e.g., and thus not reliably reporting all events). FIG. 3E is a prophetic example of a "processes with CPU events" report, showing numbers of CPU events (e.g., CPU peak usage above a specified threshold) reported, during a predefined or specified time period, broken down by process name or process type. FIG. 3F is a prophetic example of a "endpoints by type" report, showing numbers of events reported, during a predefined or specified time period, for each of a number of types of endpoint machine types or models (e.g., classes of machines, or machines running particular operating systems, etc.).

Figure 4:
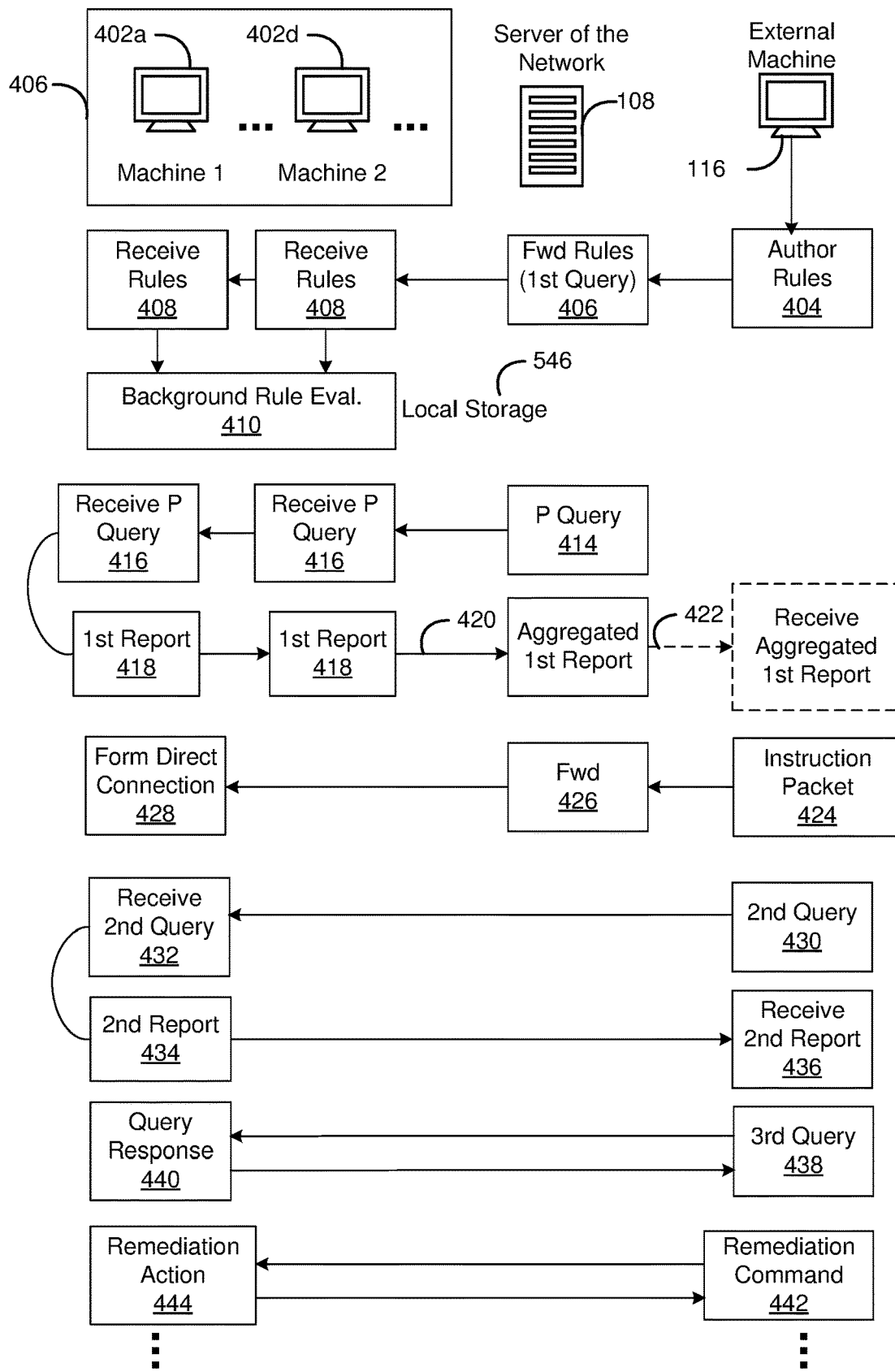
FIG. 4 is a flow chart of a method of performance evaluation, and report generation and transmission (e.g., by an exemplary endpoint machine) to a requesting server or other external machine, in accordance with some embodiments.

FIG. 4 illustrates a flow diagram of a method of performance evaluation, and report generation and transmission to a requesting server or other external machine, executed in large part at computational machines in a network that includes a non-static collection of machines, in accordance with some embodiments. The non-static collection of machines includes a linear communication orbit 406, e.g., corresponding to a respective linear communication orbits 106 discussed above with reference to FIGS. 1A and/or 1B. In some embodiments, before the method is performed, a set of one or more rules are authored (404) and forwarded (406) to at least some of the machines 402 (e.g., 402a, 402d) in the non-static collection of machines. In some embodiments, the set of one or more rules are authored at a machine external to the linear communication orbit (e.g., administrator machine 116 or external server 110, herein collectively called external machine 116 for ease of reference) and forwarded by a server of the network (e.g., server 108) to respective machines in the collection of machines. In some embodiments, the set of one or more rules are both authored and forwarded to the collection of machines by a server, such as server 108 (FIGS. 1A, 1B) of the network. In some embodiments, each rule specifies a condition or a combination of conditions, each condition corresponding to a performance metric in a predefined set of performance metrics that are monitored by the machines 402 (e.g., 402a, 402d) in the non-static collection of machines. A respective condition typically includes a performance metric and a criterion against which the performance metric is evaluated to produce a result.

Each respective endpoint machine (e.g., 102a, 102d, etc.) in the collection of machines receives (408) the set of one or more rules and stores a copy of those rules in its local rules database (e.g., local rules database 528, FIG. 5). However, in some embodiments, one or more of the rules includes filter criteria (210, FIG. 2), and rules whose filter criteria are not satisfied as not stored in the receiving machine's local rules database. In some other embodiments, rules whose filter criteria are not satisfied are nevertheless stored in the receiving machine's local rules database, but are not evaluated so long as the filter criteria are not satisfied. For simplicity of explanation, it may be initially assumed that all the rules in the "set of one or more rules" are locally stored in the receiving machine's local rules database, even if one or more other rules received by the receiving machine are not stored in the receiving machine's local rules database due to non-satisfaction of the filter criteria of those other rules.

In some embodiments, each respective endpoint machine that has received and locally stored rules in the set of one or more rules performs a background evaluation of the rules in the set of one or more rules (410). In some embodiments, the background rule evaluation is performed by background processing module 550 (FIG. 5), and the results for the background rule evaluation at each respective machine are stored in a local database 546 at the respective machine. In some embodiments, each rule in the set of one or more rules specifies a combination of two or more conditions, each condition of the two or more conditions corresponding to a performance metric in the set of performance metrics monitored by the respective endpoint machine. In some other embodiments, one or more of the rules specifies a single condition. In either case, a respective condition typically comprises a performance metric in the set of monitored performance metrics and a criterion against which the performance metric is evaluated to produce a result. In some embodiments, when a rule specifies two or more conditions, the rule may include or be evaluated as a Boolean expression of the two or more conditions.

In some embodiments, the background evaluation (at each respective endpoint machine) is performed by a background processing module (or process) that automatically monitors a predefined set of performance metrics of the respective machine, including memory usage, processor usage, and communication channel usage. Furthermore, the background processing module automatically persistently stores, locally at the respective machine, in a time series database, the monitored predefined set of performance metrics and metadata for events associated with processes executed by the respective machine. The rules in the set of one or rules are evaluated using the information in the time series database.

At a first time, subsequent to receiving the rules (408), a respective machine 102a in the collection of machines 1002 receives (416) a performance query through the linear communication orbit, wherein the performance query has been propagated (414) from a respective server (e.g., server 108) to the respective machine (e.g., machine 402a) though one or more upstream machines (e.g., machines that are upstream of the respective machine 102a) along the linear communication orbit 406. In some embodiments, the performance query is a request for results corresponding to an individual rule, or a subset of the set of one or more rules, or all the rules in the set of one or more rules. Typically, the performance query is received (at the first time) after the set of one or more rules has been forwarded (406) to the respective machine 102a, and the respective machine 102a has evaluated the one or more rules (410) for one or more time periods. In some embodiments, the time periods are predefined, such as successive hourly time periods, while in other embodiments or in some circumstances (e.g., a respective rule specifies a different time period than the time period used for one or more other rules) the time period for a respective rule is defined by the rule itself. In some embodiments, the performance query may request results for a time period that is not yet complete, in which case the received results will be for a subset of the time period, bracketed by a predefined start time for the time period and an end time that is either specified by the performance query or corresponding to the time at which the performance query is received by the respective machine.

In response to receiving the performance query, the respective machine, for each respective rule in the set of one or more rules, identifies events (if any), in either its locally stored time series database 544 (e.g., in embodiments in which background rule evaluation is not implemented) or its local database 546 for rule evaluation results, that satisfy the respective rule. Subsequent to receiving the performance query, the respective machine retrieves (e.g., from local database 546 for rule evaluation results) or generates (418) a first performance report identifying processes whose performance during the specified time period satisfies at least one rule in the set of one or more rules, and sends (420) the first performance report through the linear communication orbit to the respective server via an end machine (e.g., at an end machine) of the linear communication orbit. In some embodiments, the first performance report corresponds to the first report 224 described above with reference to FIG. 2. In some embodiments, the first performance report also includes information (e.g., aggregated event information, such as counts of one or more event types) corresponding to the second report 220 described above with reference to FIG. 2. In some embodiments, each of the machines 402 in the linear communication orbit 406 having performance information relevant to any of the evaluated rules (or relevant to any of the rules for which information is requested by the performance query) returns a performance report through the linear communication orbit to the respective server.

In some embodiments, the respective machine sends the first performance report by adding the first performance report to a payload portion of the performance query, and then forwarding the performance query to a next downstream machine in the same linear communication orbit 402 as the respective machine. In some embodiments, the end machine aggregates all the first performance reports from machines in the linear communication orbit 402, and sends that aggregated report to the respective server. In some embodiments, the respective server itself aggregates the first performance reports from the machines in the linear communication orbit, while in yet other embodiments, each endpoint machine aggregates its first performance report with all performance reports (if any) already included in the payload portion of the performance query. In some embodiments, the respective server forwards (422) the aggregated report to an external machine, such as external machine 116. As described above, in some embodiments the information included in the first performance report is computed by the respective machine, and stored in a local rules database 202 or local database 546 for rule evaluation results of the respective machine, using background processing, prior to receiving the performance query.

In some embodiments, the predefined set of performance metrics of the respective machine and the metadata for events associated with processes executed by the respective machine, which the background processing module stores in the time series database, include one or more workload metrics, memory storage unit usage metrics, predefined events including application malfunctions, processor usage exceeding a predefined threshold, memory usage exceeding a predefined threshold, communication network impairments, and/or events that violate predefined rules.

In some embodiments, the first query includes, in addition to the set of one or more rules, one or more singleton rules, and a respective singleton rule specifies a performance metric in the monitored predefined set of performance metrics and a criterion against which the specified performance metric is evaluated to produce a result. In some instances, a respective singleton rule specifies an event type, such as a process failure or communication failure, in which case existence of an event of that event type is the criterion. In some embodiments, a respective rule in the set of one of more rules includes a first portion specifying an event type and a second portion specifying a performance metric and a criterion against which the specified performance metric is evaluated to produce a result.

In some embodiments, the first performance report includes, as discussed above with respect to first report 224 and FIG. 2, for each rule in the set of one or more rules, information identifying each process, if any, whose performance during the specified time period satisfies at least one rule in the set of one or more rules.

In some embodiments, the first performance report includes, for each process identified as satisfying at least one rule in the set of one or more rules, information concerning values of a plurality of the performance metrics of the process during the specified time period. For example, the information included in the first performance report includes average, median and/or peak values of at least first, second and third performance metrics in the plurality of the performance metrics of the process during the specified time period. Optionally, the information included in the first performance report includes one or more counts of events during the specified time period, with respect to an identified process, that satisfy at least one rule in the set of one or more rules.

At a second time, subsequent to the first time, the respective machine receives (428) from an external machine, external to the linear communication orbit, an instruction packet 424 (e.g., corresponding to instruction packet 122 in FIG. 1B) via the linear communication orbit. In some embodiments, the external machine is the respective server. The instruction packet 424 is propagated (426, e.g., forwarded by server 108) to the respective machine through one or more upstream machines along the linear communication orbit. In some embodiments, the instruction packet includes an instruction for establishing a direct duplex connection between the respective machine and the external machine. In response to receiving the instruction packet through the linear communication orbit, the respective machine forms the direct duplex connection by sending an outbound connection request to the external machine to establish the direct duplex connection between the respective machine and the external machine in accordance with a respective network connection protocol. In some embodiments, the external machine is the respective server (e.g., external machine 116 and server 108 are the same machine).

After the direct duplex connection has been established, the respective machine sends to the external machine, via the direct duplex connection, additional information (e.g., second report 434), not included in the first report, with respect to performance information (and/or event metadata) stored locally in the time series database of the respective machine. As shown in FIG. 4, in some embodiments, after the direct duplex connection has been established, the respective machine receives (432) one or more queries (e.g., second query 430) and sends the additional information to the external machine in response to the one or more queries.

In some embodiments, sending the additional information includes sending a continuing stream of the additional information, including information corresponding to current performance of the respective machine. In some embodiments, after the direct duplex connection has been established, the respective machine receives (432) one or more queries (e.g., second query 430) specifying performance information to be sent to the external machine, and in response to the one or more queries, sends the specified performance information on continuing basis, as a continuing stream of additional information. In some embodiments, the continuing stream of additional information (e.g., performance metrics for executing processes; event information for detected events) is produced and sent to the external machine in real time, as events and process conditions satisfying the one or more rules are detected. In some embodiments, the continuing stream of additional information (e.g., performance metrics for executing processes; event information for detected events) comprises performance metrics and event information (e.g., for events and process conditions satisfying one or more rules, or one or more specified queries) produced at predefined repeating intervals (sometimes called regular intervals), e.g., every N seconds, where N is typically a number between 1 and 60. and sent to the external machine in real time, as events and process conditions satisfying the one or more rules, or one or more specified queries, are detected.

The additional information, not included in the first performance report (e.g., a second report 434), sent to the external machine via the direct duplex connection, is then received (436) and processed by the external machine. In some embodiments, the additional information (e.g., second report 234) is determined by the respective machine (e.g., extracted from the locally stored time series database, or generated based at least in part from information in the locally stored time series database) in response to one or more queries (e.g., second query 434), received by the respective machine after the direct duplex connection has been established, while in other embodiments or circumstances, the additional information is computed prior to receiving the second query, as part of the background processing 410. In some embodiments, the additional information includes a snapshot of the locally stored time series database (or a particular portion of the locally stored time series database) on the particular machine and have it uploaded to the external machine, so that in-depth analysis regarding the particular machine may be performed at the external machine (e.g., according to instructions provided by an administrator to the external machine).

The external machine can be used to send further queries, e.g., third query 438, and the respective machine sends further reports (e.g., query response 440) in response. For example, after inspection of the information received in response to the first and second queries, the administrator of the external server may send one or more follow up queries, based on the response to the first and/or second queries, to further investigate the causes of conditions detected using the responses to the first and/or second queries. The responses to the subsequent queries sent by the respective machine may include locally stored files (stored at the respective machine), metadata or content from files stored at the respective machine, and/or information stored in other databases at the respective machine.

In some embodiments, the server 108 or external machine 116 includes instructions or a module (e.g., remediation module 634, FIG. 6, or remediation module 734, FIG. 7) for addressing performance problems on an endpoint machine by initiating or commanding performance (e.g., sending a remediation command 442, FIG. 4) of one or more remediation actions (e.g., remediation action 444) at the endpoint machine. An example of a remediation action is terminating execution (sometimes informally called "killing") of a process (e.g., a process whose performance information indicates a serious malfunction) at the endpoint machine; if the terminated process (also called killed process) is a process used to perform particular tasks as part of an application or the like, terminating execution of the process forces the process to be reinitiated and/or restarted. Additional examples of remediation actions are installing an application at the endpoint machine, or uninstalling or reinstalling an application at the endpoint machine. The remediation actions may be effected by the server 108 or external machine 116 via either a direct duplex connection with the endpoint machine, or using control messages sent via a location communication orbit to the endpoint machine.

In some embodiments, the direct duplex connection used for the second and third reports is an encrypted communication connection in which information sent by the respective machine to the external machine is encrypted. (e.g., to protect confidential information).

In some embodiments, a respective rule in the set of one or more rules includes executable instructions, or a reference to executable instructions (also herein called executable code), for determining if events matching a set of one or more conditions specified by the respective rule also satisfy additional criteria required for satisfying the respective rule. In some embodiments, optionally, the executable code is part of the rule and is evaluated as part of evaluation of the rule, or alternatively, is evaluated only after all other portions of the rule are evaluated. In one example, the executable instructions determine whether the process associated with the event is exempted from, or specially targeted by, the rule.

In some embodiments, the external machine sends 438 a third query to the respective machine, where the third query includes an updated version of at least one rule in the set of one or more rules. In some embodiments, updated rules are treated like new rules, and are evaluated, in the background, against all applicable information in the time series database, as described above for the original set of one or more rules. The respective machine returns 440 a query response, either in response to the third query (438) or a subsequent query, for example, a response that includes any of the reports described herein.

FIG. 5 is a block diagram of an exemplary endpoint machine 102 as shown in FIGS. 1A and 1B. In some embodiments, endpoint machine 102 includes one or more processors 502, memory (e.g., persistent memory 503 and non-persistent memory 504) for storing programs and instructions for execution by the one or more processors 502, one or more communications interfaces such as input/output interface 506 and network interface 508, and one or more communications buses 510 for interconnecting these components.

In some embodiments, input/output interface 506 includes a display and input devices such as a keyboard, a mouse, or a track-pad. However, in some embodiments, endpoint machine 102 does not include an input/output interface 506. In some embodiments, communication buses 510 include circuitry (sometimes called a chipset) that interconnects and controls communications between system components. In some embodiments, non-persistent memory 504 includes high-speed random-access memory, such as DRAM, SRAM, DDR RAM or other random-access solid-state memory devices. In some embodiments, persistent memory 503 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid-state storage devices. In some embodiments, persistent memory 503 optionally includes one or more storage devices remotely located from the one or more processors 502. In some embodiments, persistent memory 503 and/or the non-volatile memory device(s) within the non-persistent memory 504 comprises a non-transitory computer readable storage medium.

In some embodiments, memory 504 or alternatively the non-transitory computer readable storage medium stores the following programs, modules and data structures, instructions, or a subset thereof:

- Operating System 512 that includes procedures for handling various basic system services and for performing hardware dependent tasks.
- Optionally, I/O module 514 that includes procedures for handling various basic input and output functions through one or more input and output devices.
- Communication module 516, which includes:
  - LCO communications module 518 that includes instructions for (1) connecting machine 102 to other machines (e.g., other machines 102 in network 100) in the same linear communication orbit 106 (FIGS. 1A, 1B) as machine 102, and (2) handling receipt, processing, propagation, collection and reporting of system, security and network management messages and commands, and/or distribution of files and software updates via the linear communication orbit.
  - Direct connection module 520 that includes instructions to establish a direct full duplex connection with an external machine, such as server 110 or external machine 116, in response to an instruction packet received by machine 102 via the linear communication orbit.
  - Non-LCO communications module 522 that includes instructions for connecting machine 102 to servers (e.g., server 108) via one or more network communication interfaces 508 (wired or wireless) and one or more communication networks, such as the Internet, other wide area networks, local area networks, metropolitan area networks, and so on.
- Orbit formation and maintenance module 524 that includes instructions to self-insert machine 102 into a linear communication orbit, self-heal from a broken link in the linear communication orbit, and maintain the linear communication orbit for network and system management.
- Query/Command and Response Module 526 that includes instructions for processing data requests and other commands received from a preceding machine, succeeding machine, server, or other external machine.
- Local rules database 528 (e.g., corresponding to local rules database 202, shown in FIG. 2) that includes a local copy of each of the rules sent to endpoint machine 102 by a respective server, and optionally includes rule evaluation results generated by rule evaluation module 532, as discussed above with reference to FIG. 2.
- Rule evaluation module 532 that includes instructions or submodules for rule evaluation 534, for generating one or more reports (e.g., using first report generation instructions or submodule 536, second report generation instructions or submodule 538, and optionally third report generation instructions or submodule 540) regarding processes whose performance during a specified time period satisfy a respective rule, or a subset of the rules or each of the rules stored in local rules database 202; for example, a first report of the one or more reports identifies processes, if any, whose performance during the specified time period satisfy the criterion specified by the respective rule, and a second report of the one or more reports includes one or more counts of events that satisfy the respective rule;
- Time series database 544, which stores values of monitored performance metrics as well as metadata for events associated with processes executed by the respective machine.
- Background processing module 550 that includes instructions for performing rule evaluation (using rule evaluation module 532) as a background task or process, and monitoring and storing performance metrics and event metadata in time series database index 544 as a background task or process. These background tasks or processes are executed while endpoint machine 102 continues to perform its primary functions (execution of other modules 556).

Optionally, direct connection report module 552 that includes instructions for sending one or more reports (e.g., query responses, copies of locally stored files or metadata and/or content from such files) to a server or external machine through a direct duplex connection.

Optionally, local data 554 such as messages, files, reports, and/or other information (e.g., file identifying information) that is stored locally (e.g., in a local database of machine 102), temporarily or otherwise; in some embodiments or circumstances, portions of local data 554 is stored by the respective machine upon receipt from a preceding machine, succeeding machine, server, or external machine; in some embodiments or circumstances, portions of local data 554 is locally generated, revised or supplemented by machine 102; and in some embodiments or circumstances, portions of local data 554 is transmitted by the respective machine to a preceding machine, succeeding machine, server, or external machine.

Optionally, other modules 556 that include instructions for handling other functions and aspects described herein, such as creation and maintenance of local event logs, security evaluations, locally installed applications, etc.

FIG. 5 is merely illustrative of the structures of machines 102. A person skilled in the art would recognize that particular embodiments of machines 102 may include more or fewer components than those shown. One or more modules may be divided into sub-modules, and/or one or more functions may be provided by different modules than those shown.

FIG. 6 is a block diagram of an exemplary computer system 108, sometimes called server 108, or server system 108 (e.g., server 108 of the networks shown in FIGS. 1A and 1B). In some embodiments, server 108 includes one or more processors 602, memory (e.g., persistent memory 603 and non-persistent memory 604) for storing programs and instructions for execution by one or more processors 602, one or more communications interfaces such as input/output interface 606 and network interface 608, and one or more communications buses 610 for interconnecting these components. In some embodiments, the one or more communication interfaces couple server 108 to, and enable communications with machines in a non-static collection of machines (e.g., machines 102, FIGS. 1A and 1B). More specifically, in some embodiments, the one or more communication interfaces, such as network interface 408, couple server 108 to one or more linear communication orbits (e.g., LCOs 106, FIGS. 1A and 1B).

In some embodiments, input/output interface 606 includes a display and input devices such as a keyboard, a mouse, or a track-pad. However, in some embodiments, server system 108 does not include an input/output interface 606. In some embodiments, communication buses 610 include circuitry (sometimes called a chipset) that interconnects and controls communications between system components. In some embodiments, non-persistent memory 604 includes high-speed random access memory, such as DRAM, SRAM, DDR RAM or other random access solid state memory devices. In some embodiments, persistent memory 603 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. In some embodiments, persistent memory 603 optionally includes one or more storage devices remotely located from the one or more processors 602. In some embodiments, persistent memory 603 and/or the non-volatile memory device(s) within the non-persistent memory 604 comprises a non-transitory computer readable storage medium.

In some embodiments, memory 604, or alternatively the non-transitory computer readable storage medium, stores the following programs, modules, data structures, instructions, or a subset thereof:

Operating System 612 that includes procedures for handling various basic system services and for performing hardware dependent tasks.

Optionally, I/O module 614 that includes procedures for handling various basic input and output functions through one or more input and output devices.

Communication module 616, which comprises:
  LCO communications module 618 that includes instructions for (1) connecting server 108 to other machines (e.g., other machines 102 in network 100) in one or more linear communication orbits 106 (FIGS. 1A, 1B) connected to and serviced by server 108, (2) handling receipt, processing, propagation, collection and reporting of system, security and network management messages and commands via the one or more linear communication orbits connected to and serviced by server 108, and/or distribution of files and software updates.

Direct connection module 620 that includes instructions for sending an instruction packet to a specified machine 102 on a linear communication orbit, instructing that machine 102 to initiate an outbound connection to an external machine (e.g., server 108 or server 110), establishing a direct full duplex connection between the specified machine 102 and the external machine, which can then be used by the external machine to inspect and update machine 102.

Non-LCO communications module 622 that includes instructions for connecting server 108 to other machines, such as other servers 108 or 110, administrator machine(s) 116, etc., via one or more network communication interfaces 408 (wired or wireless) and one or more communication networks, such as the Internet, other wide area networks, local area networks, metropolitan area networks, and so on.

Orbit formation and maintenance module 624 that includes instructions to determine and provide ordinal positions of machines 102 in an ordered sequence of a set of managed machines currently known to be coupled to network 100; and optionally includes instructions for a machine to self-insert into a linear communication orbit, self-heal from a broken link in the linear communication orbit, and maintain the linear communication orbit for network and system management.

Query/Command and response module 626 that includes instructions for sending rules and queries to one or more machines in one or more linear communication orbits, retrieving results and query responses, and sending said results and responses to an analysis module, such as analysis module 640, discussed below. In some embodiments, query/command and response module 626 provides a user interface for a network or system administrator to directly perform various system and network functions, such as sending out rules and/or queries.

Rule authoring module 628 that includes instructions for composing rules, including rule components such as conditions (e.g., a list of one or more conditions, or a Boolean expression of two or more conditions), one or more filters for limiting or defining the applicability of a respective rule, and optionally executable code. In some embodiments, rule authoring module 628 provides a user interface for a network or system administrator to directly determine rule contents.

Rules 630 (e.g., a copy of the set of one or more rules), that includes each rule (e.g., rules 632-1, 632-2, 632-M, etc.) propagated from server 108 through a linear communication network.

Aggregated report generation module 636 that includes instructions for collecting and compiling one or more reports received from respective endpoint machines, and/or one or more query responses from one or more endpoint machines in one or more linear communication orbits (e.g., collecting data from one or more linear communication orbits).

Optionally, direct connection report module 638 that includes instructions for collecting information (e.g., query responses, copies of files or metadata and/or content of files) from a machine 102 through a direct duplex connection.

Optionally, a remediation module 634, for addressing performance problems on an endpoint machine by initiating or commanding performance of one or more remediation actions at the endpoint machine, e.g., by terminating execution of a process at the endpoint machine (e.g., thereby forcing the process to be reinitiated and/or restarted), installing an application at the endpoint machine, or uninstalling or reinstalling an application at the endpoint machine, via either a direct duplex connection with the endpoint machine, or using control messages sent via a location communication orbit to the endpoint machine.

Analysis module 640 that includes instructions for analyzing raw data items collected from one or more linear communication orbits, organizing the raw data items and/or derived data items (i.e., result data from the analysis), and storing result data from the analysis of the collected raw data items in local data 642.

Local data 642 such as messages, files, reports and/or other information (e.g., for storing result data that has been analyzed after transmission from machines in one or more linear communication orbits) that is stored, temporarily or otherwise, upon receipt from other machines, and/or that is locally generated, revised, or supplemented.

Optionally, other modules 644, including function modules, that include instructions for handling other functions and aspects described herein, such as creation and maintenance of local event logs and performing security evaluations.

FIG. 6 is merely illustrative of the structures of server 108. A person skilled in the art would recognize that particular embodiments of server 108, for example, may include more or fewer components than those shown. One or more modules may be divided into sub-modules, and/or one or more functions may be provided by different modules than those shown.

FIG. 7 is a block diagram of an exemplary computer system 116, such as an administrator machine of the network shown in FIG. 1. In some embodiments, administrator machine 116 includes one or more processors 702, memory (e.g., persistent memory 703 and non-persistent memory 704) for storing programs and instructions for execution by one or more processors 702, one or more communications interfaces such as input/output interface 706 and network interface 708, and one or more communications buses 710 for interconnecting these components.

In some embodiments, input/output interface 706 includes a display and input devices such as a keyboard, a mouse, or a track-pad. However, in some embodiments, administrator machine 116 does not include an input/output interface 706. In some embodiments, communication buses 710 include circuitry (sometimes called a chipset) that interconnects and controls communications between system components. In some embodiments, non-persistent memory 704 includes high-speed random access memory, such as DRAM, SRAM, DDR RAM or other random access solid state memory devices. In some embodiments, persistent memory 703 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. In some embodiments, persistent memory 703 optionally includes one or more storage devices remotely located from the one or more processors 702. In some embodiments, persistent memory 703 and/or the non-volatile memory device(s) within the non-persistent memory 704, comprises non-transitory computer readable storage medium.

In some embodiments, memory 704, or alternatively the non-transitory computer readable storage medium, stores the following programs, modules, data structures, instructions, or a subset thereof:

Operating System 712 that includes procedures for handling various basic system services of administrator machine 116 and for performing hardware dependent tasks.

Optionally, I/O module 714 that includes procedures for handling various basic input and output functions through one or more input and output devices.

Communication module 716, which comprises:
  Direct connection module 720 that includes instructions for sending an instruction packet, via a server 108, to an endpoint machine 108, instructing the endpoint machine to initiate an outbound connection to administrator machine 116 (or another external machine such as server 110), establishing a direct full duplex connection with administrator machine 116 or other external machine.
  Non-LCO communications module 722 that includes instructions for handling communications between administrator machine 116 and other machines, such as server 108, via one or more network communication interfaces 708 (wired or wireless) and one or more communication networks, such as the Internet, other wide area networks, local area networks, metropolitan area networks, and so on.

Query/Command and response module 726 that includes instructions for sending rules and queries to one or more machines in one or more linear communication orbits, retrieving results and query responses, and sending said results and responses to analysis module 740. In some embodiments, query/command and response module 726 provides a user interface for a network or system administrator to directly perform various system and network functions, such as sending out rules and/or queries.

Rule authoring module 728 that includes instructions for composing rules, including rule components such as conditions (e.g., a list of one or more conditions, or a Boolean expression of two or more conditions), one or more filters for limiting or defining the applicability of a respective rule, and optionally executable code. In some embodiments, rule authoring module 728 provides a user interface for a network or system administrator to directly determine rule contents.

Rules 730 (e.g., a local copy of the set of one or more rules), that includes each rule (e.g., rules 732-1, 732-2, 732-M, etc.) propagated from a network server and/or an external machine through a linear communication network.

Aggregated report generation module 736 that includes instructions for collecting and compiling one or more reports received from respective endpoint machines, and/or one or more query responses from one or more endpoint machines in one or more linear communication orbits (e.g., collecting data from one or more linear communication orbits).

Optionally, direct connection report module 738 that includes instructions for collecting information one or (e.g., query responses, copies of files or metadata and/or content of files) from a machine 102 through a direct duplex connection.

Optionally, a remediation module 734, for addressing performance problems on an endpoint machine by initiating or commanding performance of one or more remediation actions at the endpoint machine, e.g., by terminating execution of a process at the endpoint machine (e.g., thereby forcing the process to be reinitiated and/or restarted), installing an application at the endpoint machine, or uninstalling or reinstalling an application at the endpoint machine, via either a direct duplex connection with the endpoint machine, or using control messages sent via a location communication orbit to the endpoint machine.

Analysis module 740 that includes instructions for analyzing raw data items collected from one or more linear communication orbits, organizing the raw data items and/or derived data items (i.e., result data from the analysis), and storing result data from the analysis of the collected raw data items in local data 742.

Local data 742 such as messages, files, reports and/or other information (e.g., for storing result data that has been analyzed after transmission from machines in one or more linear communication orbits) that is stored, temporarily or otherwise, upon receipt from other machines, and/or that is locally generated, revised, or supplemented.

Optionally, other modules 744, including function modules, that include instructions for handling other functions and aspects described herein, such as creation and maintenance of local event logs and performing security evaluations.

FIG. 7 is merely illustrative of the structures of exemplary computer system 116. A person skilled in the art would recognize that particular embodiments of exemplary computer system 116, for example, may include more or fewer components than those shown. One or more modules may be divided into sub-modules, and/or one or more functions may be provided by different modules than those shown.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first widget could be termed a second widget, and, similarly, a second widget could be termed a first widget, without changing the meaning of the description, so long as all occurrences of the "first widget" are renamed consistently and all occurrences of the "second widget" are renamed consistently. The first widget and the second widget are both widgets, but they are not the same widget.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method, comprising:
at a server system in communication with a plurality of managed machines, the plurality of managed machines self-organized into a linear communication orbit by coordinating with neighbor machines:
causing each respective machine of the plurality of managed machines to automatically monitor performance metrics associated with the respective machine, each respective machine to responsively store the performance metrics and associated metadata in accordance with one or more rules, the performance metrics associated with memory utilization, processor utilization, and/or communication channel utilization of one or more processes executed by the respective machine;
transmitting a query to a first machine of the plurality of managed machines, the plurality of managed machines, responsive to the query, to collectively generate a merged report comprising aggregated respective portions of the performance metrics and associated metadata indicated by the query; and receiving the merged report from a last machine of the plurality of managed machines in the linear communication orbit.

2. The method of claim 1, wherein the respective portions of the performance metrics and associated metadata are associated with a particular period of time indicated by the query.

3. The method of claim 1, wherein each respective machine following the first machine in the linear communication orbit is to receive a message corresponding to the query from a neighbor machine along the linear communication orbit, the message indicating the respective portions of the performance metrics and associated metadata to be added to the message by the respective machine.

4. The method of claim 1, wherein the respective portions of the performance metrics and associated metadata includes machine-specific performance metrics and associated metadata corresponding to the respective machine and aggregated performance metrics and associated metadata aggregated from all or a subset of the plurality of managed machines.

5. The method of claim 1, wherein the plurality of managed machines are to collectively generate the merged report by:
generating a first report by the first machine, the first report comprising a respective portion of the performance metrics and associated metadata indicated by the query;
transmitting by the first machine and each successive machine in the linear communication orbit, a message including the first report to a respective neighbor machine in the linear communication orbit;
adding to the first report by each machine following the first machine in the linear communication orbit, a respective portion of the performance metrics and associated metadata indicated by the query;
generating the merged report by the last machine of the plurality of managed machines by adding its respective portion of the performance metrics and associated metadata to the first report.

6. The method of claim 2, wherein the associated metadata comprises event metadata related to monitored events on the respective machine.

7. The method of claim 6, wherein the event metadata includes an event type and a date and time associated with each respective event, the date and time within the particular period of time indicated by the query.

8. The method of claim 7, wherein the event metadata further includes data associated with processes executed by the respective machine.

9. The method of claim 8, wherein the event metadata further includes a machine identifier (ID) to indicate a respective machine, and parameters indicating that one or more of the performance metrics exceeded a threshold specified by a corresponding rule of the one or more rules.

10. The method of claim 9, wherein the parameters are to further indicate one or more of: application malfunctions, processor usage exceeding a predefined threshold, memory usage exceeding a predefined threshold, communication network impairments, and/or events that violate predefined rules.

11. The method of claim 1 wherein the query indicates one or more conditions, each condition corresponding to a performance metric of the performance metrics associated with the respective machine.

12. The method of claim 11 wherein at least one condition of the one or more conditions comprises an indication of a performance metric and a criterion against which the performance metric is evaluated to generate a respective portion of the associated metadata.

13. The method of claim 12 wherein the merged report includes, for a rule in the one or more rules, information identifying a process, if any, whose performance during the particular time period satisfied the rule.

14. The method of claim 13, wherein the merged report includes information related to execution of the process on one or more machines of the plurality of managed machines.

15. A non-transitory computer-readable storage medium having program code stored thereon which, when executed by a server system in communication with a plurality of managed machines self-organized into a linear communication orbit by coordinating with neighbor machines, causes the server system to perform operations, comprising:
causing each respective machine of the plurality of managed machines to automatically monitor performance metrics associated with the respective machine, each respective machine to responsively store the performance metrics and associated metadata in accordance with one or more rules, the performance metrics associated with memory utilization, processor utilization, and/or communication channel utilization of one or more processes executed by the respective machine;
transmitting a query to a first machine of the plurality of managed machines, the plurality of managed machines, responsive to the query, to collectively generate a merged report comprising aggregated respective portions of the performance metrics and associated metadata indicated by the query; and
receiving the merged report from a last machine of the plurality of managed machines in the linear communication orbit.

16. The non-transitory computer-readable storage medium of claim 15, the respective portions of the performance metrics and associated metadata are associated with a particular period of time indicated by the query.

17. The non-transitory computer-readable storage medium of claim 1, wherein each respective machine following the first machine in the linear communication orbit is to receive a message corresponding to the query from a neighbor machine along the linear communication orbit, the message indicating the respective portions of the performance metrics and associated metadata to be added to the message by the respective machine.

18. The non-transitory computer-readable storage medium of claim 15, wherein the respective portions of the performance metrics and associated metadata includes machine-specific performance metrics and associated metadata corresponding to the respective machine and aggregated performance metrics and associated metadata aggregated from all or a subset of the plurality of managed machines.

19. The non-transitory computer-readable storage medium of claim 15, wherein the plurality of managed machines are to collectively generate the merged report by:
generating a first report by the first machine, the first report comprising a respective portion of the performance metrics and associated metadata indicated by the query;
transmitting by the first machine and each successive machine in the linear communication orbit, a message including the first report to a respective neighbor machine in the linear communication orbit;
adding to the first report by each machine following the first machine in the linear communication orbit, a respective portion of the performance metrics and associated metadata indicated by the query;

generating the merged report by the last machine of the plurality of managed machines by adding its respective portion of the performance metrics and associated metadata to the first report.

20. The non-transitory computer-readable storage medium of claim 19, wherein the associated metadata comprises event metadata related to monitored events on the respective machine.

21. The non-transitory computer-readable storage medium of claim 20, wherein the event metadata includes an event type and a date and time associated with each respective event, the date and time within the particular period of time indicated by the query.

22. The non-transitory computer-readable storage medium of claim 21, wherein the event metadata further includes data associated with processes executed by the respective machine.

23. The non-transitory computer-readable storage medium of claim 22, wherein the event metadata further includes a machine identifier (ID) to indicate a respective machine, and parameters indicating that one or more of the performance metrics exceeded a threshold specified by a corresponding rule of the one or more rules.

24. The non-transitory computer-readable storage medium of claim 23, wherein the parameters are to further indicate one or more of: application malfunctions, processor usage exceeding a predefined threshold, memory usage exceeding a predefined threshold, communication network impairments, and/or events that violate predefined rules.

25. The non-transitory computer-readable storage medium of claim 15 wherein the query indicates one or more conditions, each condition corresponding to a performance metric of the performance metrics associated with the respective machine.

26. The non-transitory computer-readable storage medium of claim 25 wherein at least one condition of the one or more conditions comprises an indication of a performance metric and a criterion against which the performance metric is evaluated to generate a respective portion of the associated metadata.

27. The non-transitory computer-readable storage medium of claim 26 wherein the merged report includes, for a rule in the one or more rules, information identifying a process, if any, whose performance during the particular time period satisfied the rule.

28. The non-transitory computer-readable storage medium of claim 27, wherein the merged report includes information related to execution of the process on one or more machines of the plurality of managed machines.

* * * * *